(12) United States Patent
Brusatore

(10) Patent No.: US 7,415,796 B2
(45) Date of Patent: Aug. 26, 2008

(54) METHOD AND APPARATUS FOR GROWING PLANTS

(75) Inventor: Nicholas Gordon Brusatore, Port Moody (CA)

(73) Assignee: Terrasphere Systems LLC, Boston, MA (US)

( * ) Notice: Subject to any disclaimer, the term of this patent is extended or adjusted under 35 U.S.C. 154(b) by 53 days.

(21) Appl. No.: 11/073,562

(22) Filed: Mar. 8, 2005

(65) Prior Publication Data

US 2006/0196118 A1 Sep. 7, 2006

(30) Foreign Application Priority Data

Mar. 7, 2005 (CA) .................................... 2499512

(51) Int. Cl.
*A01G 9/02* (2006.01)
*A01G 31/00* (2006.01)

(52) U.S. Cl. ............................. 47/82; 47/83; 47/59 R; 47/62 R

(58) Field of Classification Search ........... 47/59 R–63, 47/17, 18, 65, 65.5, 57, 85, 48.5, 79–83, 47/1.3, 67, 39, 66.5
See application file for complete search history.

(56) References Cited

U.S. PATENT DOCUMENTS

| | | | |
|---|---|---|---|
| 1,500,917 A | 7/1924 | Bell | |
| 3,747,268 A | 7/1973 | Linder | |
| 3,909,978 A | 10/1975 | Fleming | |
| 3,973,353 A * | 8/1976 | Dedolph | 47/65 |
| 4,356,664 A * | 11/1982 | Ruthner | 47/65 |
| 5,157,869 A | 10/1992 | Minton | |
| 5,515,648 A * | 5/1996 | Sparkes | 47/65 |
| 5,617,673 A * | 4/1997 | Takashima | 47/60 |
| 5,862,628 A * | 1/1999 | Takashima | 47/65.8 |
| 6,378,246 B1 | 4/2002 | DeFoor | |
| 6,604,321 B2 | 8/2003 | Marchildon | |
| 6,766,817 B2 * | 7/2004 | da Silva | |
| 6,837,002 B2 | 1/2005 | Costa | |
| 6,840,007 B2 * | 1/2005 | Leduc et al. | 47/62 C |
| 6,918,404 B2 * | 7/2005 | Dias da Silva | |
| 6,928,772 B2 | 8/2005 | Bai et al. | |
| 6,951,076 B2 | 10/2005 | Winsbury | |
| 6,983,562 B2 | 1/2006 | Sanderson | |

(Continued)

FOREIGN PATENT DOCUMENTS

CA 2431523 A1 9/2004

(Continued)

OTHER PUBLICATIONS

PCT International Search Report and the Written Opinion in International App. No. PCT/US06/07945 (10 pp.).

*Primary Examiner*—Andrea M Valenti
(74) *Attorney, Agent, or Firm*—Dinesh Agarwal, P.C.

(57) ABSTRACT

Method and apparatus for growing plants includes an enclosed vessel having a growth medium containing a plant seed or seedling in the upper part thereof and a free space below into which plant roots can enter, a mechanism to feed water and nutrients to the vessel to saturate the growth medium, a mechanism to remove excess water and nutrients after reaching saturation, and a mechanism to regulate the amounts, intervals and rates of water and nutrients being fed for optimum plant growth.

28 Claims, 13 Drawing Sheets

U.S. PATENT DOCUMENTS

| | | |
|---|---|---|
| 7,066,586 B2 * | 6/2006 | da Silva |
| 7,285,255 B2 * | 10/2007 | Kadlec et al. |
| 2002/0144461 A1 | 10/2002 | Marchildon |
| 2004/0111965 A1 | 6/2004 | Agius |
| 2004/0163308 A1 * | 8/2004 | Uchiyama ................ 47/1.01 R |
| 2005/0011119 A1 * | 1/2005 | Bourgoin et al. ............... 47/61 |
| 2005/0039396 A1 * | 2/2005 | Marchildon ................ 47/62 E |
| 2005/0039397 A1 * | 2/2005 | Roy ........................... 47/62 R |
| 2005/0055878 A1 * | 3/2005 | Dumont ...................... 47/62 R |
| 2006/0230674 A1 * | 10/2006 | Marchildon .................... 47/60 |
| 2007/0212281 A1 * | 9/2007 | Kadlec et al. |
| 2008/0015531 A1 * | 1/2008 | Hird et al. |

FOREIGN PATENT DOCUMENTS

| | | | |
|---|---|---|---|
| FR | 2680074 A1 * | | 2/1993 |
| JP | 4229111 A | | 8/1992 |
| JP | 2001128571 A | * | 5/2001 |
| SU | 420288 | | 3/1974 |
| SU | 650557 | | 3/1979 |
| SU | 914004 B | * | 3/1979 |
| SU | 914004 | * | 3/1982 |
| SU | 2034448 C | * | 5/1992 |

* cited by examiner

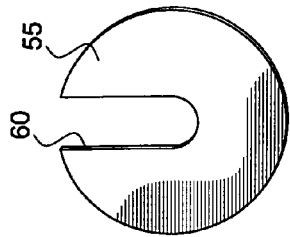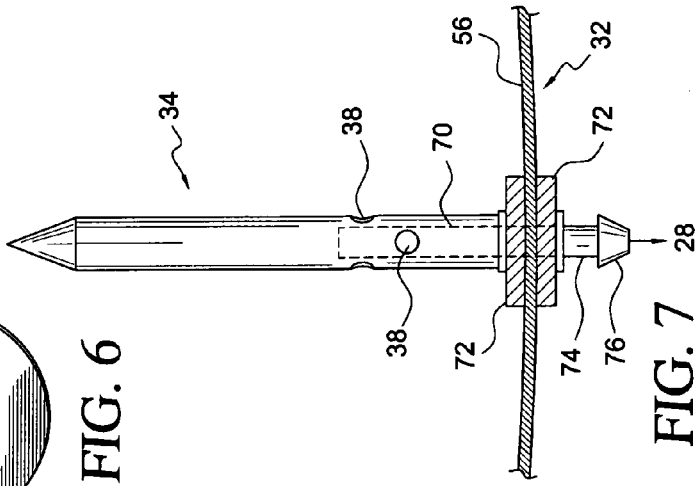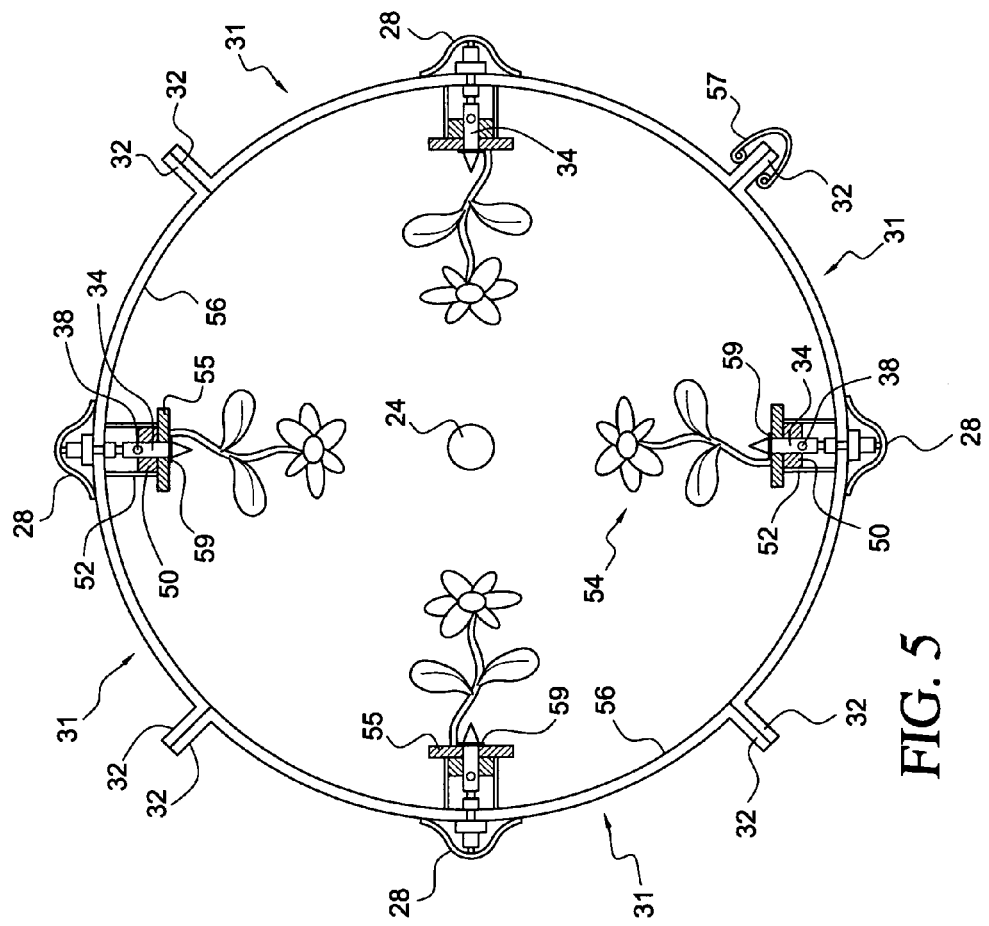

METHOD AND APPARATUS FOR GROWING PLANTS

FIELD OF THE INVENTION

This invention relates to method and apparatus for growing plants in a controlled setting using and precisely controlling combinations of light, water, nutrition, gravity, centrifugal forces, temperature and gasses to produce ideal growing conditions resulting in maximum possible plant growth and crop production.

SUMMARY OF THE INVENTION

The invention provides a highly efficient system that can grow a variety of commercially desirable crops in simple, compact, automated facilities. The volume of crops that can be grown in a given space is increased by a factor of four in a preferred embodiment compared to traditional methods. The invention creates a highly controlled environment that is suitable for significantly enhancing plant growth in places where it was previously unfeasible because of economic or environmental constraints. Environmentally, the invention uses significantly less water than traditional methods and avoids problems associated with the disposal of nutrient solutions and growth media. The invention can be used to grow a variety of crops, including leafy vegetables, herbs, medicinal plants, fruits and berries.

The invention provides rotating spheres that hold rows of plants growing towards to a light source at the center of each sphere. Each individual plant is connected to a precision nutrient supply system. Carousels hold multiple spheres in two vertical columns and rotate the spheres while providing interconnection with the nutrient supply system. Carousels are set up side-by-side in rows with an adjacent conveyor belt for planting and harvesting.

In operation, spheres are populated with seeds or seedlings and managed through a prescribed grow-out regime that includes nutrient application, inspection and testing, quality control and, when needed, intermediate treatments (thinning, culling, pollination, pest control). Mature crops are harvested, and post-harvest maintenance, such as cleaning, prepares the modules for another production cycle.

The invention thus provides a method for growing plants in a controlled setting which includes the steps of:
  (a) providing a global array of seeds or seedlings in growth media carried on approximately equally spaced porous needles that point at the center of the globe;
  (b) providing a growth promoting light source generally at the center of the globe which is operable during periods of plant growth and non-growth; and
  (c) rotating the growth media and needles around the light source and simultaneously delivering, at predetermined intervals, amounts and rates, water, plant nutrients and/or selected gasses to the rotating seeds or seedlings via the needles, the rate of rotation and the intervals, amounts and rates of simultaneous delivery being selected for optimum plant growth towards the light source.

The invention also provides apparatus for growing plants which includes:
  (a) a global array of approximately equally spaced porous needles which point at the center of the globe, each of the needles carrying seeds or seedlings in a growth medium;
  (b) a growth promoting light source generally at the center of the globe which is operable during periods of plant growth and non-growth;
  (c) means to rotate said needles around the light source;
  (d) means to simultaneously deliver, at predetermined intervals, amounts and rates, water, plant nutrients and/or selected gasses to the seeds or seedlings via the needles; and
  (e) means to regulate the rate of rotation and the intervals, amounts and rates of simultaneous delivery for optimum plant growth towards the light source.

In a further embodiment, the invention provides a method and apparatus growing plants which includes
  (a) providing an enclosed vessel having a growth medium containing a plant seed or seedling in the upper part thereof and a free space below into which plant roots can enter;
  (b) feeding water and nutrients to the vessel and saturating the growth medium; and
  (c) removing excess water and nutrients after reaching saturation, the amount of water and nutrients being fed, and the intervals and rates of same, being selected for optimum plant growth.

BRIEF DESCRIPTION OF THE DRAWINGS

The following drawings show preferred embodiments and are not intended to restrict or otherwise limit the invention in any way. All known functional equivalents of components or elements disclosed or shown herein are within the intent and scope of the invention.

FIG. 4 is a perspective and partly broken away view of a sphere shown in FIG. 1;

FIG. 5 is a cross-sectional view of a growth sphere of the invention showing young plants in growth media on needles for delivering growth promoting substances to the plant;

FIG. 6 is a view top of a growth medium cover shown in FIG. 5;

FIG. 7 is a side view, partly in phantom, of a delivery needle shown in FIG. 5;

DESCRIPTION OF PREFERRED EMBODIMENTS

In a preferred embodiment, the method of the invention for growing plants in a controlled atmosphere or setting includes the steps of:
  (a) positioning a plurality of approximately equally spaced apart porous needles around the interior of a closed, rotatable sphere, the needles pointing at the center of the sphere;
  (b) providing growth media on each of the needles which deliver water, plant nutrients and/or selected gases to the media;
  (c) providing each growth media with a plant seed or seeds or sprouted plants;
  (d) providing a growth promoting light source at the center of the sphere;
  (e) rotating the spheres and simultaneously delivering, at predetermined intervals, amounts and rates, water, plant nutrients and/or selected gasses to the rotating seeds or seedlings via the needles, the rate of the rotation and the intervals, amounts and rates of the simultaneous delivery being selected for optimum plant growth towards the light source; and
  (f) regulating the light source during periods of plant growth and non-growth.

Preferred apparatus according to the invention includes the following:
  (a) a plurality of vertically spaced closed, rotatable spheres;
  (b) a plurality of approximately equally spaced porous needles spaced around the interior of the spheres pointing at the center thereof, each needle carrying seeds or seedlings in growth media and being adapted to deliver water, plant nutrients and/or selected gases to the growth media;
  (c) a growth promoting light source at the center of each sphere;
  (d) means to rotate each of the spheres about its horizontal axis;
  (e) means to simultaneously deliver, at predetermined intervals, amounts and rates, water, plant nutrients and/or selected gasses to the seeds or seedlings via the needles; and
  (f) means to regulate the rate of the rotation and the intervals, amounts and rates of the simultaneous delivery for optimum plant growth towards the light source; and
  (g) means for changing the vertical position of each sphere for loading and unloading.

Figure 1:
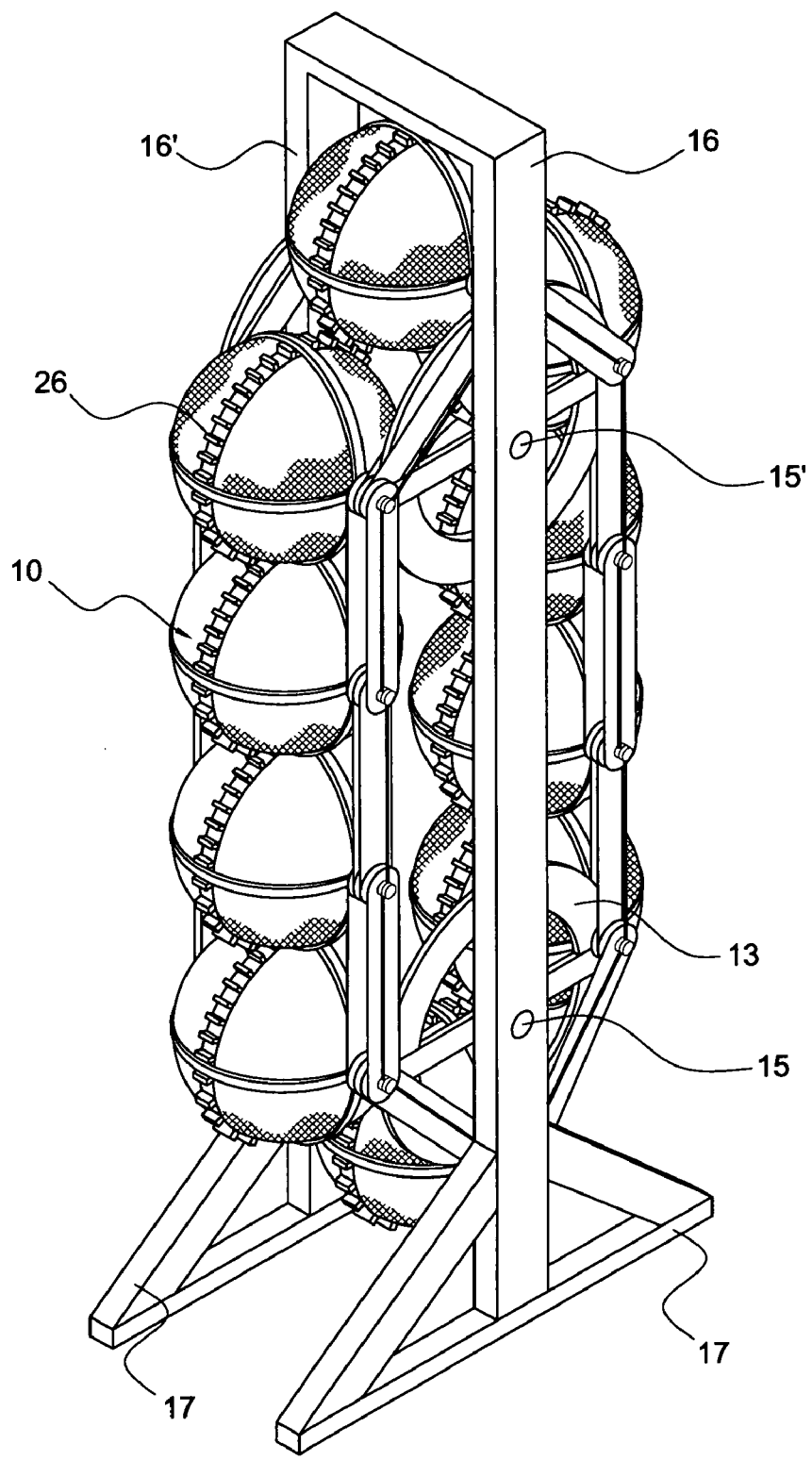
FIG. 1 is a perspective view of a preferred embodiment showing a carousel arrangement of rotatable spheres of the invention for carrying out the inventive method.
Figure 3:
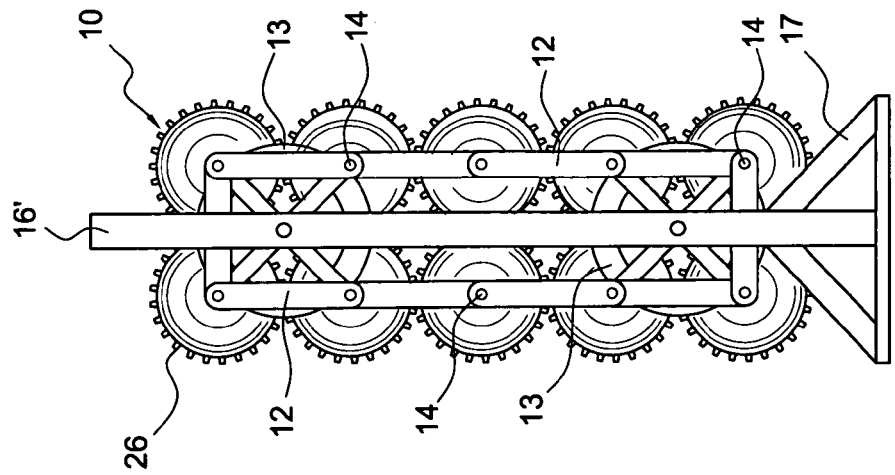
FIG. 3 is the same as FIG. 2 but from the power feed side and showing the spheres rotated to a loading/unloading position.
Figure 2:
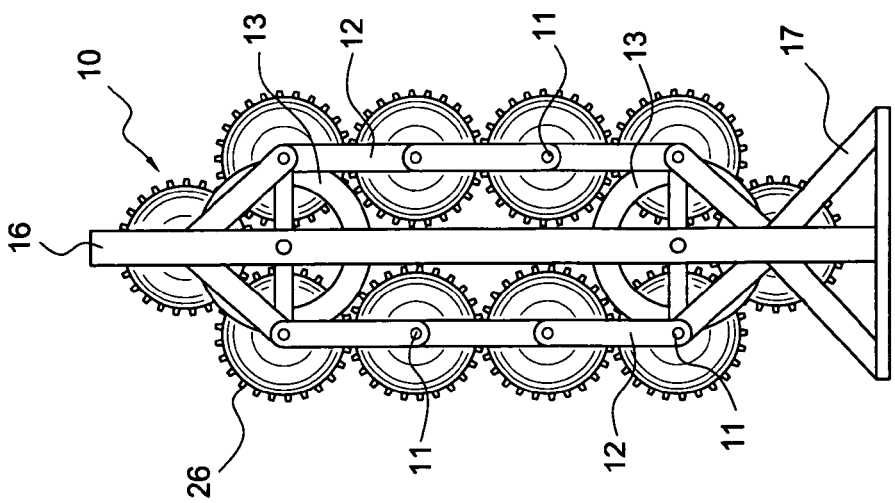
FIG. 2 is side view of the carousel of FIG. 1 from the water feed side showing the spheres in the drive position.
Figure 2B:
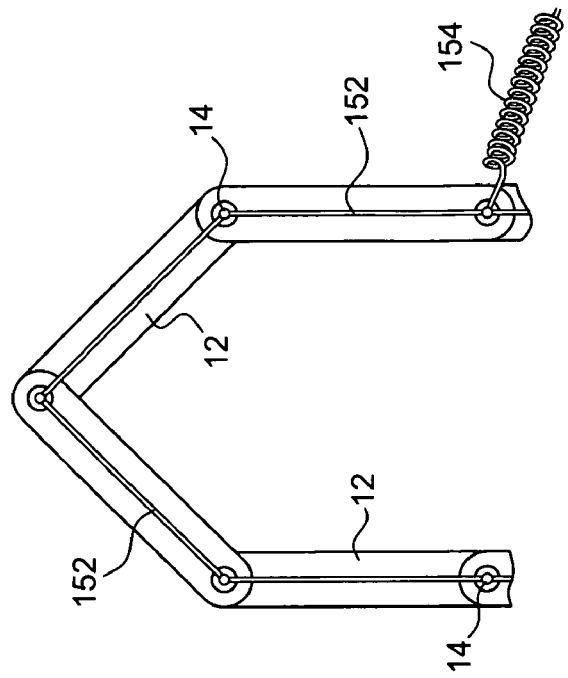
FIG. 2B is a side view partly broken away showing the power input and distribution to a set of five electrical bearing assemblies.
Figure 2A:
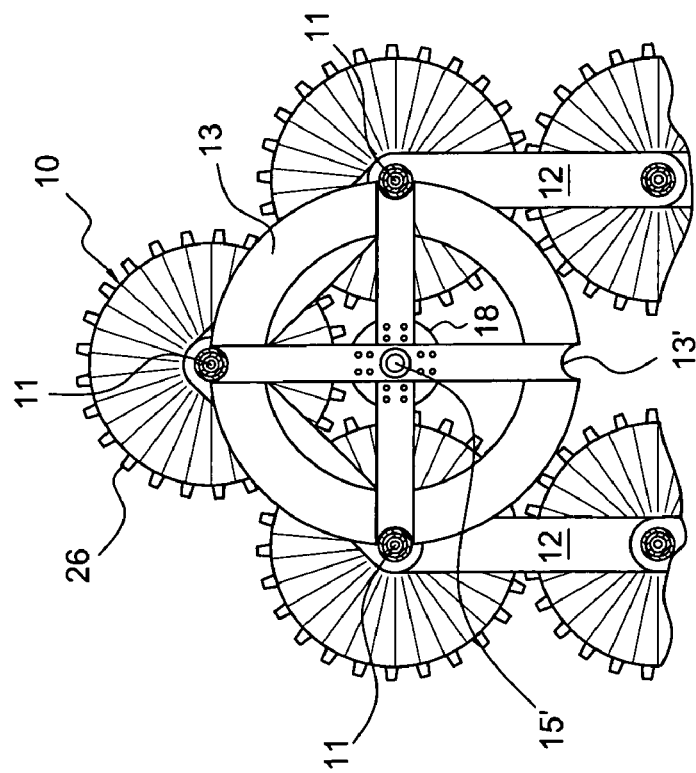
FIG. 2A is a partly broken away view along line A-A of FIG. 2 showing a drive wheel and linkages.
Figure 11:
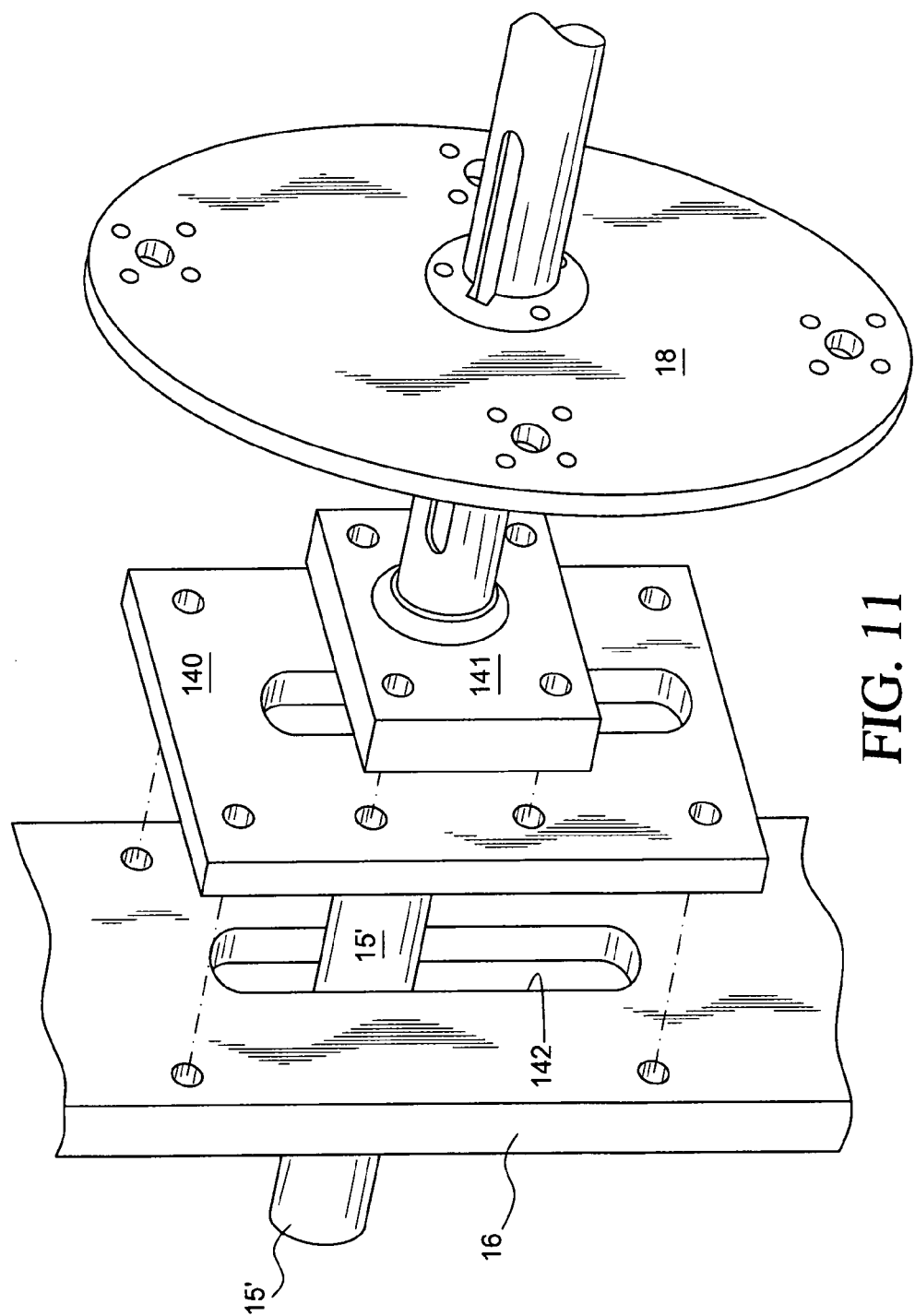
FIG. 11 is an exploded, perspective view of the drive shaft and sprocket hub assembly shown in FIGS. 2 and 3 for moving the spheres between driving and loading/unloading positions.

Referring now to the drawings, FIGS. 1, 2, 2A and 3 show a carousel containing ten spheres 10 mounted for tandem rotation by means of lower and upper shafts 15 and 15' carried by frame members 16 and 16' and base members 17, sprocket wheels 13 and links 12 interconnecting and supporting spheres 10 via water input bearing assemblies 11 on the water input side of a carousel (FIG. 2) and electrical input bearing assemblies 14 on the power input side of a carousel (FIG. 3). Sprocket wheels 13 are mounted on drive shafts 15 and 15' via sprocket hub 16 and notches 13' of wheel 13 engage sprockets 11 and 14 (FIG. 2A). Shafts 15 and 15' are adjustably mounted to frame members 16 and 16' for rotation via take up base 140, bearing 141 and slot 142 (FIG. 11). Shafts 15 and 15' can be rotated by clutch motors (not shown) to rotate all the spheres at once from a drive position in which teeth 26 on each sphere intermesh (FIG. 2) to an unloading/loading position (FIG. 3).

Figure 9:
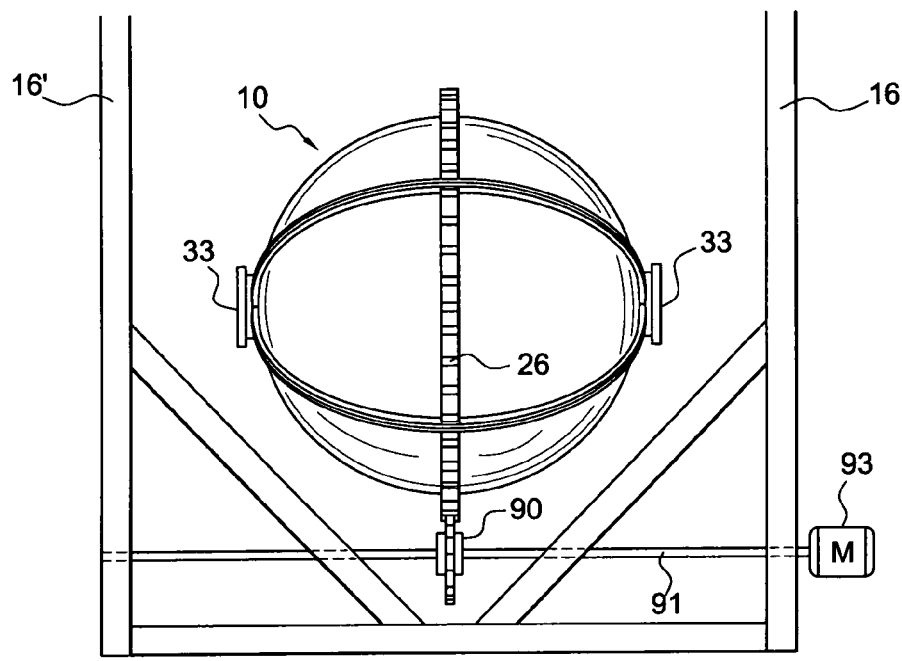
FIGS. 9 and 10 are detail side and end views of a driving mechanism for rotating the interlocked spheres shown in FIG. 1.
Figure 10:
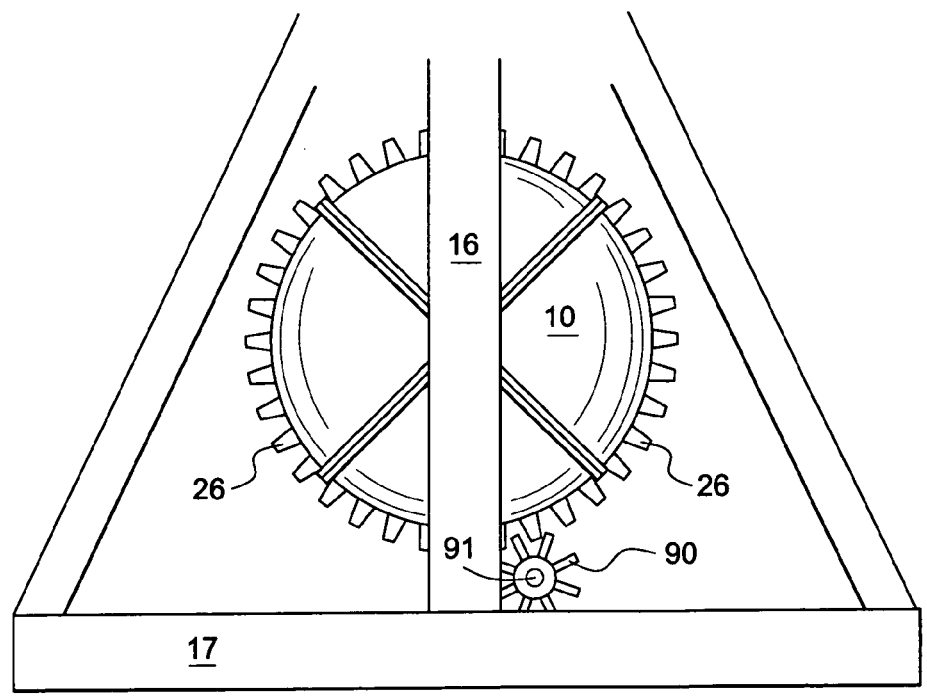

In the drive position (FIG. 2), teeth 26 located around the circumference of each sphere 10 intermesh and rotate the spheres individually via gear wheel 90 (FIGS. 9 and 10) which engages teeth 26 of the lowermost sphere 10. Drive wheel 90 is carried by shaft 91 which is supported for rotation by sealed bearing 95 on frame member 16 and a corresponding bearing on frame member 16' (not shown). Variable speed motor 93 turns drive wheel at the desired speed and can be provided with a stop and start clutch or the shaft 91 can be displaced laterally to disengage teeth 26 and gear wheel 90.

Figure 4A:
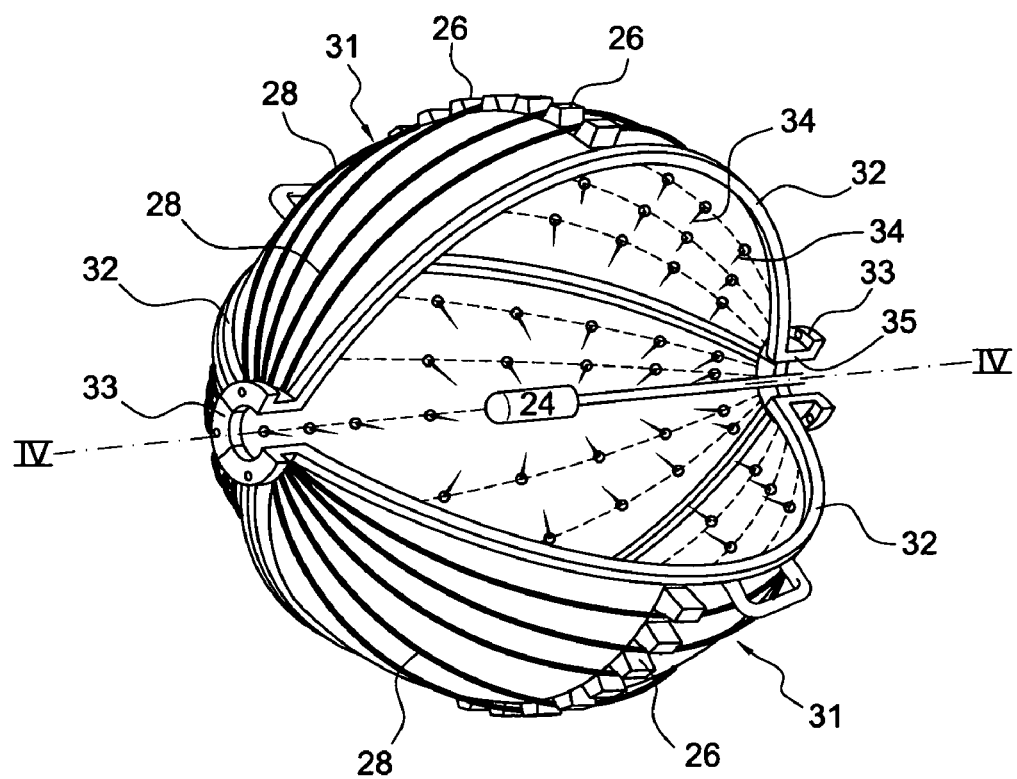
FIG. 4A is a perspective view of a sphere showing a water distribution scheme for feeding individual needles in the sphere.

As shown in FIGS. 4 and 4A, sphere segments or quarters 31 have arcuate end portions 35, end mounting flanges 33 and raised arcuate ribs 32 all of which mate when assembled to form circular apertures and flanges at each end of a sphere 10 and two-ply abutting ribs 32 which are clamped together. Longitudinal or rib-like tubes 28 are connected to manifold 40, 41 and are positioned to lie along the exterior of each sphere quarter 31 in equally divided segments to deliver water and plant nutrients simultaneously to needles 34 (FIG. 4A). In place of the handles shown in FIG. 4, cutout hand holes can be used to load and unload sphere quarters 31. Holes in the sphere wall in general help air circulation and dissipate heat build up.

Figure 4B:
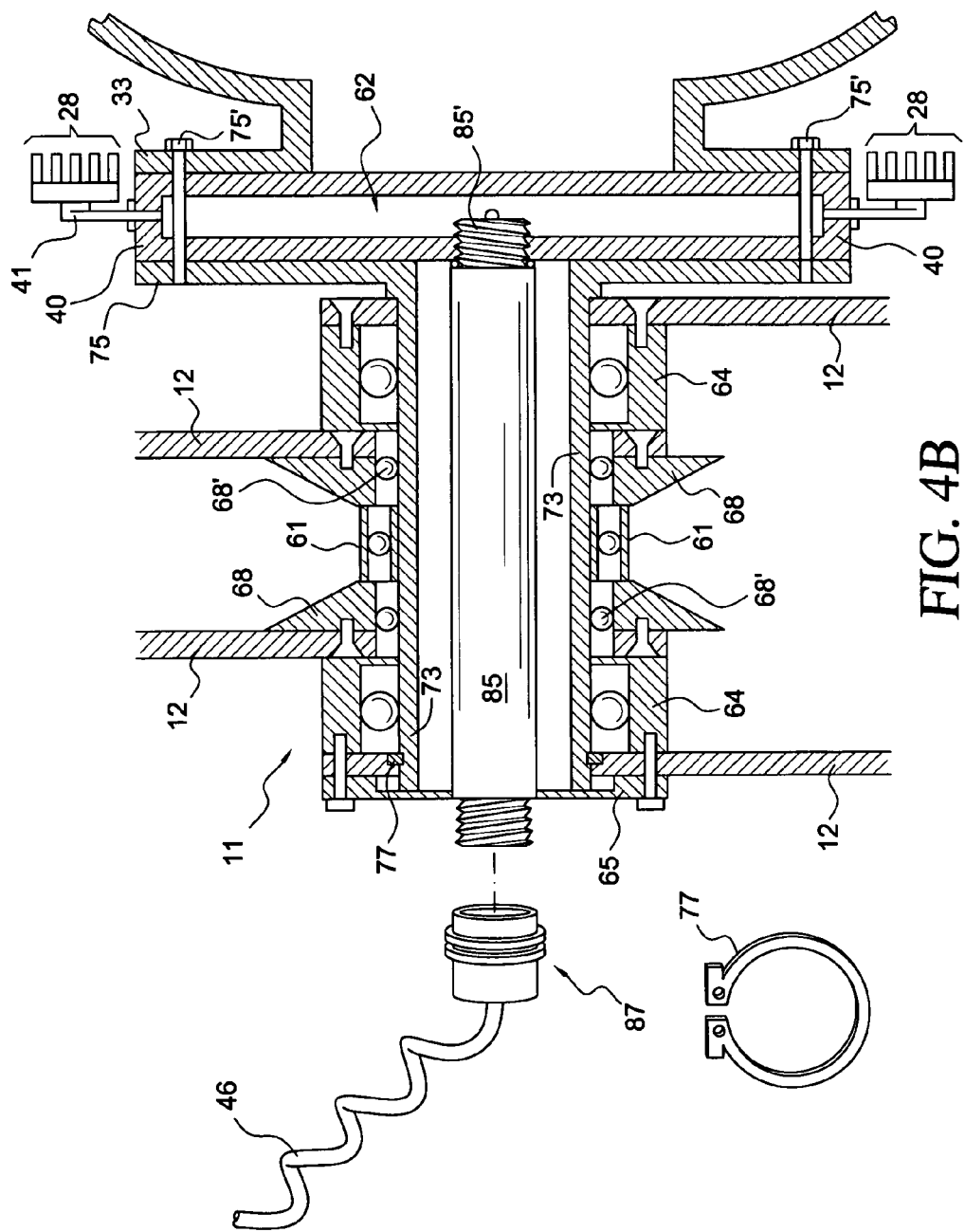
FIG. 4B is a cross-sectional view of the bearing assembly on the water input side of a sphere.
Figure 4C:
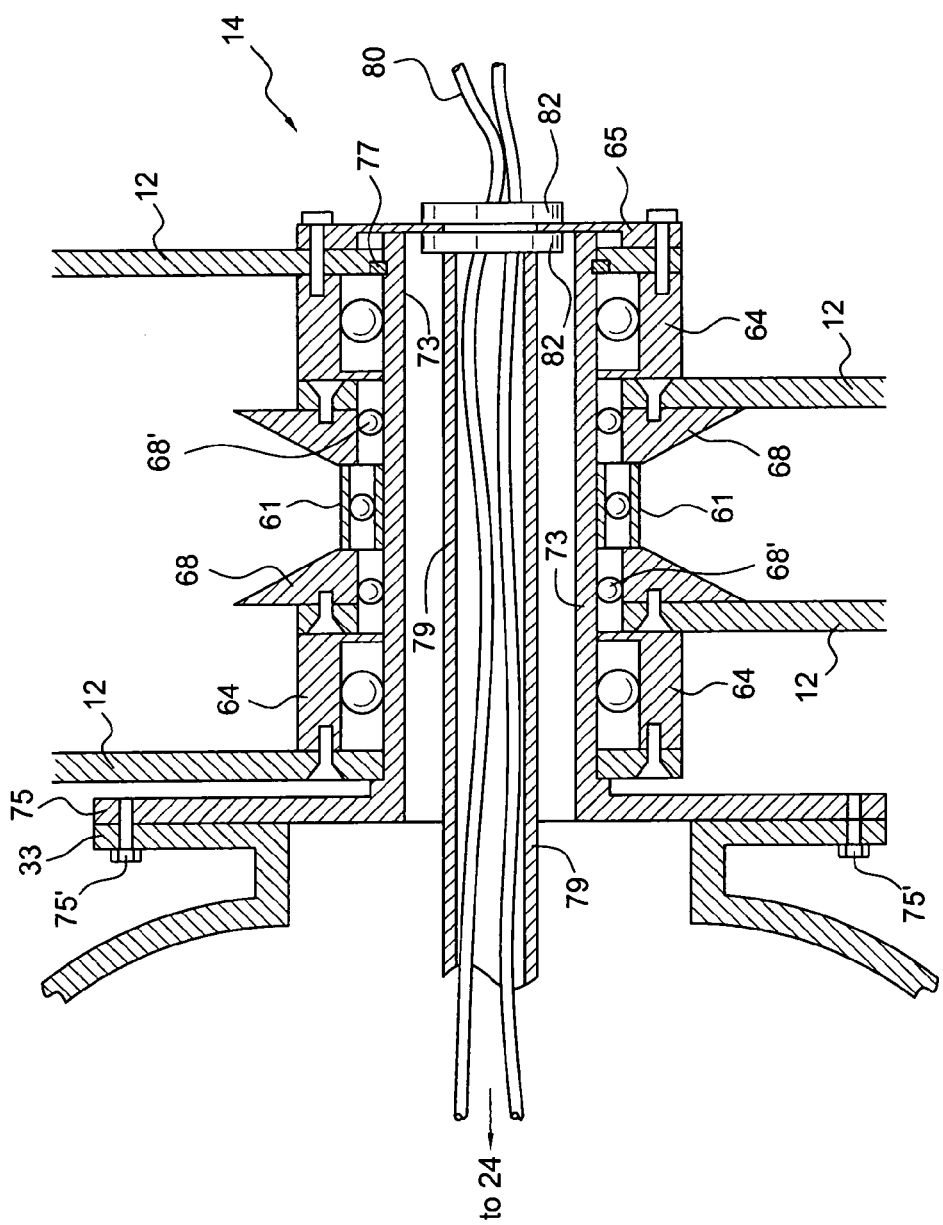
FIG. 4C is a cross-sectional view of the bearing assembly on the power side of a sphere.
Figure 4D:
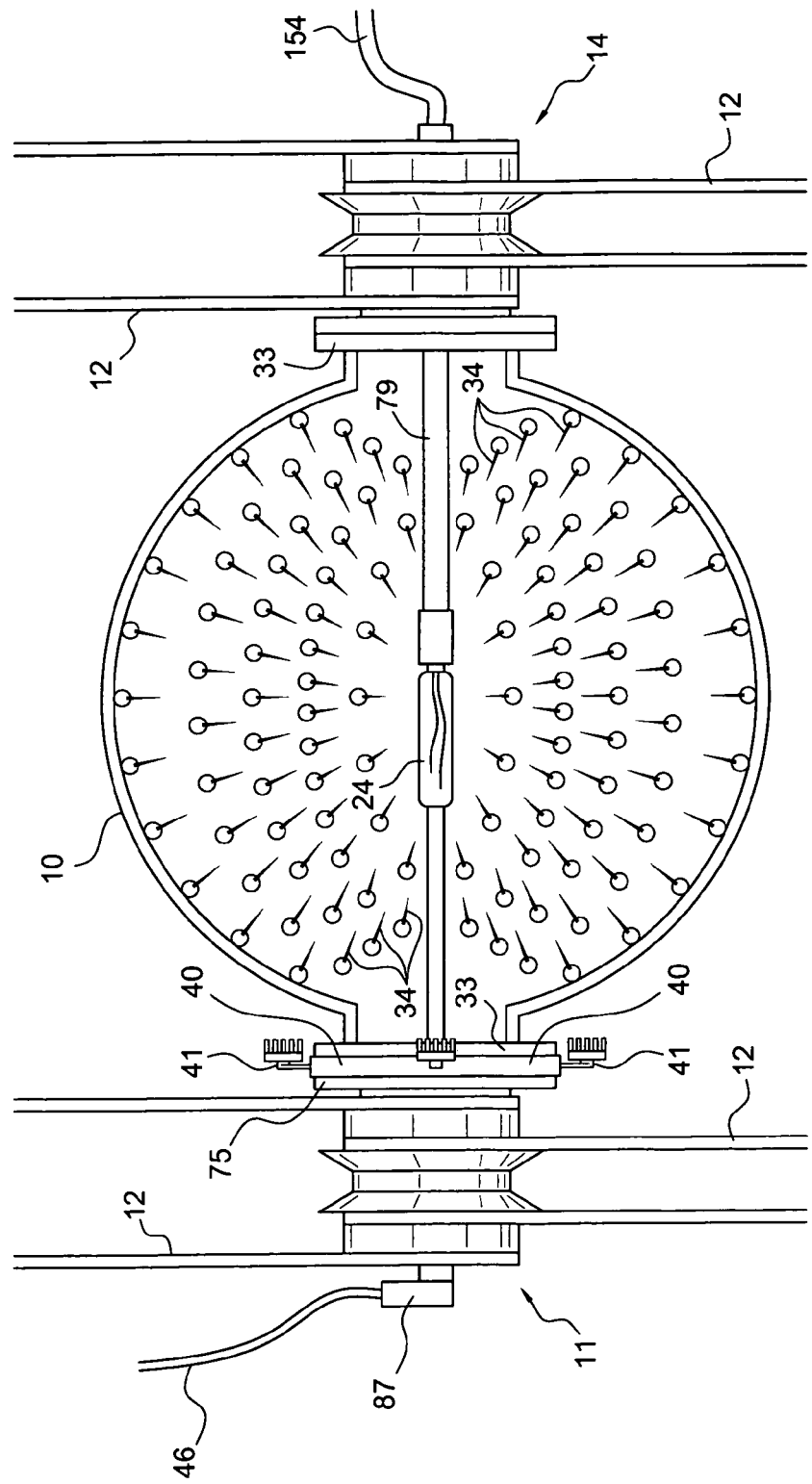
FIG. 4D is a front view, partly in cross-section, of the bearing assemblies of FIGS. 4B and 4C on either side of a sphere with interior needles lying on radial lines from the sphere center.

Water bearing assembly 11 and electrical bearing assembly 14 (FIGS. 2 and 3) are shown in detail in FIGS. 4B and 4C. Hollow shaft 73 and mounting flange 75 rotate with each sphere. On the water feed side, sphere flanges 33 are bolted to water manifold 62 which in turn is bolted to mounting flange 75. On the electrical input side, flanges 33 are bolted to flange 75.

Outer linkages 12 (FIGS. 2 and 3) on shaft 73 are connected to outer ball bearings 64 and inner linkages 12 are connected to tapered guide plates 68 (which guide notches 13' of sprocket wheel 13, FIG. 2A) and enclose inner ball bearings 68'. Central ball bearing 61 engages notches 13' for rotating the spheres in tandem. Cover plates 65 are connected though outer linkage 12 to outer bearing 64.

In FIG. 4B, threaded tube 85 connects water manifold 62 to rotating water fitting 87. Tube 85 rotates with flange 75, manifold 62 and the outlet side of fitting 87; the input side of fitting 87 swivels in place.

In FIG. 4C, conduit 79 contains wires 80 to power light source 24 and is carried by end plate 65 via opposing lock nuts 82. Snap ring 77 holds the bearings in place in both assemblies.

FIG. 2B shows diagrammatically how a group of five spheres 10 in a carousel can be supplied with power. Flexible power cord 154 is attached to one electrical bearing assembly 14 and the other four bearing assemblies 14 receive power in series via power lines 152. A similar arrangement is used to supply power to the bearing assemblies 14 of the other five spheres in a carousel. The same type of arrangement is used on the opposite side of a carousel to supply water to the spheres 10. A flexible water hose is attached to rotating water fitting 87 (FIG. 4B) of one water bearing assembly 11 (FIG. 2) and four other bearing assemblies 11 receive water in series by interconnecting hoses in a substantially similar manner as shown in FIG. 2B. The other five spheres in series receive water in the same fashion.

Needles 34 project from the inner wall of each quarter 31 in a spaced array such that each needle 34 points at the center of the sphere which contains a light source shown generally be reference numeral 24 (FIG. 4).

As shown in more detail in FIG. 7, each needle 34 has an exterior threaded portion at its base which extends thru an opening in the wall of quarter 31 and is held in place by a pair of opposing nuts 72. Each needle has an interiorly threaded bore 70 into which is screwed a barbed water fitting 74, 76 which connects with tube 28 on the exterior of quarter 31. Water from tube 28 flows thru fitting 74, 76, interior bore 70 and out via apertures 38 of needle 34.

As illustrated in simplified cross-sectional detail in FIGS. 5 and 6, four sphere quarters 31 come together at dual ribs 32, which are clamped together, with U-springs 57 for example, to form a sphere 10. Each needle 34 is mounted to the interior wall 56 of each quarter 31 as shown in FIG. 7. In the embodiment shown, Rock wool cubes 52 with a cutout portion holding peat puck 50 are pressed down over each needle 34 and held in place via cap members 55 and pressure fit rubber washers 59. Slot 60 in cap 55 (FIG. 6) allows plant 54 to grow towards light source 24 at the center a sphere 10 with its roots extending into puck 50 and Rock wool 52.

It is also possible to employ longer needles with misting heads at intervals among the plants in a sphere. Such needles would be connected to the water distribution system to mist the interior of the sphere at selected intervals and durations. Misting can be desirable when growing plants that require high humidity conditions.

Figure 8:
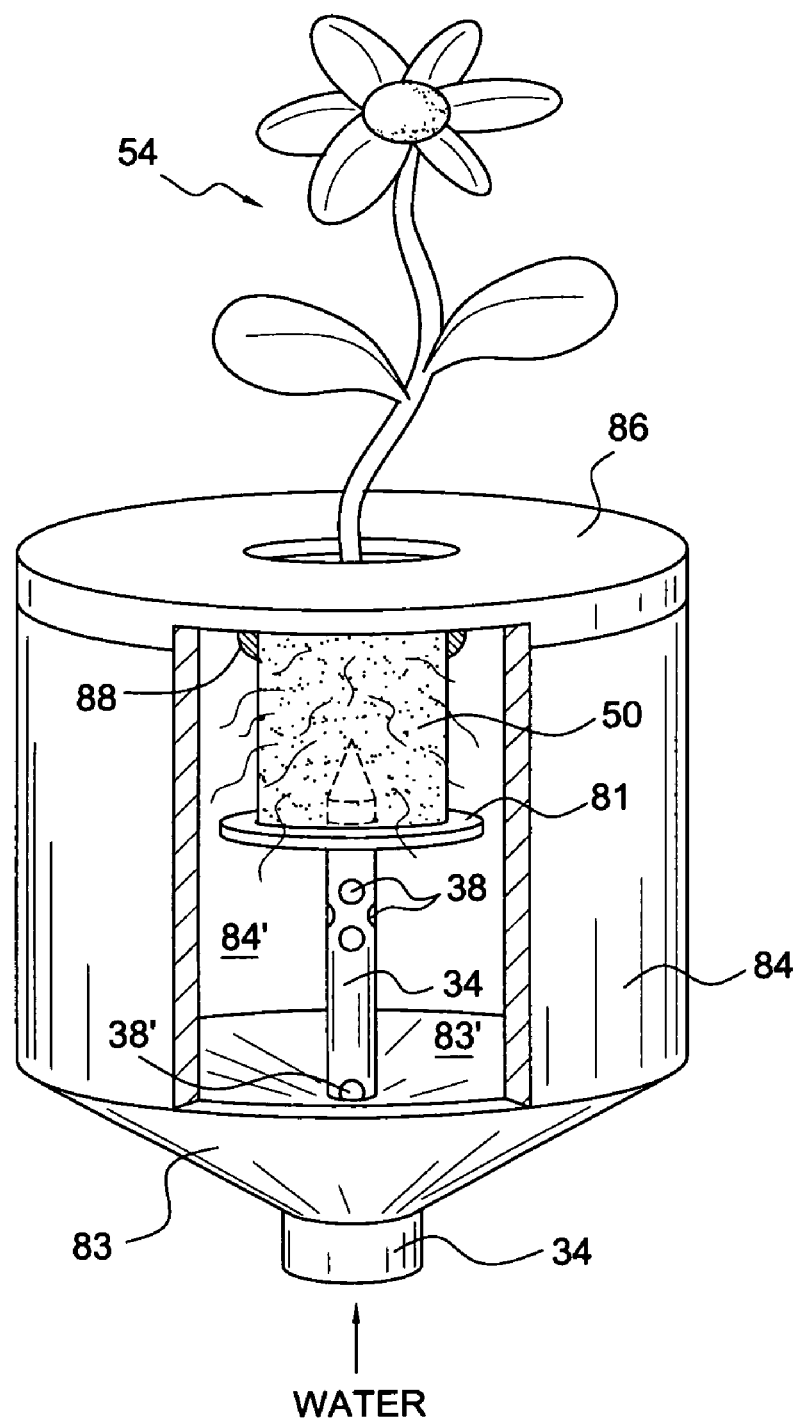
FIG. 8 is a perspective view, partly broken away, of an alternate embodiment of a growth vessel and delivery needle according to the invention.

FIG. 8 shows an alternate embodiment for the growing medium shown in FIG. 5. Hollow circular vessel 84 has a conical base 83 forming a sloping inner floor 83' which receives needle 34 centrally as show. Disc like member 81 is mounted to the upper end of needle 34 and supports peat puck 50 against cover 86, preferably within ring 88 on the underside of cap 86. Plant 54 grows in puck 50 thru a central opening in cap 86 and its roots enter the free space in vessel 84 as shown. Water and nutrients are fed thru needle 34 and enter free space 84' thru apertures 38 simultaneously in all vessels 84 in a given rotating sphere 10. Once the roots and puck 50 are saturated, the water feed system can be reversed to remove excess water that is funneled towards aperture 38' at the base of needle 34 and at the same time draw air and/or oxygen into puck 50 in enhance plant growth. Rotation of the spheres 10 causes excess water to collect at the bottom 83' of vessel 84 for removal thru aperture 38'.

The embodiment of FIG. 8 is not limited to use in a rotating sphere as described herein. It can be used in an otherwise conventional hydroponics system with the advantage of avoiding and preventing over watering and root rot. Banks of vessels 84 can be connected to a common water feed system whereby water and nutrients flood the interior of vessel 84 via needle 43 at selected intervals, contacting exposed plant roots and saturating peat puck 50. Over watering is avoided by reversing the water feed system when saturation is reached, thereby drawing out excess water from the base of vessel 84 thru aperture 38' and drawing air in thru puck 50 to enhance plant growth.

Vessel 84 can also be filled with mineral soil and/or peat to provide a grown medium with similar qualities as soil in a field. Soil and/or peat can be certified organic for growing organic crops.

Vessel 84 can be made of thermoplastic for reuse with new or refreshed medium 50. The walls of vessel 84 can be porous so as to allow air to pass through but not water.

Growth medium 52 (FIG. 5) and growth vessels 84 (FIG. 8) can be three to four inches in diameter or square and three to four inches high. Seeds, which can be in porous rubber or plastic seed carriers, are pushed down into the growth medium 50. Pre-grown seedlings can be planted in the growth medium in a similar fashion. As the seeds germinate, roots extend into the medium 50 and receive water and nutrients via apertures 38 in needles 34.

In general, plants are known to respond to gravity, light and nutrients. The gravity response predominates which means plants will inherently grow against gravity even if it means growing away from a light source. Thus, plants that are inverted will turn and grow away from the source of gravity regardless of where the light is coming from. According to the invention, the gravity response is neutralized by regulating the rotational speed of the spheres to create micro-gravity which causes the rotating plants to grow towards the central light source. Rotation of the spheres at selected rates in effect tricks the plants into growing towards the light source regardless of their position in the sphere and their rotation about its central horizontal axis. Rotational speeds can be determined empirically and will vary between about 1 and about 10 revolution per minute (rpms), preferably between about 1 and about 5 rpms, depending on the crop being grown. Thus, stunted or flat or spreading growth in a plant that normally grows upright can be corrected by increasing the rpms in increments until the plants resumes their normal growth pattern.

Rotational speed of the spheres, watering with nutrients, gas supply, temperature, air circulation, light source and periods of light and darkness are selected for optimum plant growth as illustrated in the examples.

Simultaneous watering of all the plants in a sphere insures even weight distribution and prevents unbalancing which can have an adverse effect on the operation of a carousel such as shown on FIG. 1. For example, uneven weight distribution can cause uneven bearing wear, drive motor overheating and failure, stressing of linkages, seams and joints and like problems leading to equipment breakdown and failure. Because all the plants in a sphere receive substantially the same light, nutrients and rotational speed, increase in weight due to plant growth is also evenly distributed thus maintaining smooth balanced rotation.

The water distribution system shown in FIG. 4A for example, is operated at a pressure such that water reaches all of the needles in a sphere at substantially the same time to deliver substantially the same amount of water to each plant to maintain even weight distribution and balance throughout the sphere. If more precise release of water to each needle is desired for certain growing conditions, such as when using high rotational speeds, simple pressure relief valves can be installed at the base of each needle. This will ensure that all needles will release water at the same time when a threshold water pressure is reached.

Different crops can be grown in the same sphere but growth rates and crop weight should be considered to maintain even weight distribution and balance. Two diverse crops with different growth rates and/or crop weights can be grown is one sphere without creating an imbalance by having like plants grown in opposite sphere quarters. For example, leaf lettuce can be grown in quarters 1 and 3 while Romaine lettuce is grown in quarters 2 and 4.

Light source 24 delivers growth promoting UV light during selected intervals to the plants growing on the interior of the spheres. The light source 24 is mounted at the center of each sphere at the end of conduit 79 (FIG. 4C) and is powered by electrical input wires 80. The light source can be a fluorescent tube or tubes, a light emitting diode (LED), a high pressure sodium lamp, other metal halide lamps or an ordinary light bulb or bulbs in the center of the sphere.

Figures 12, 13:
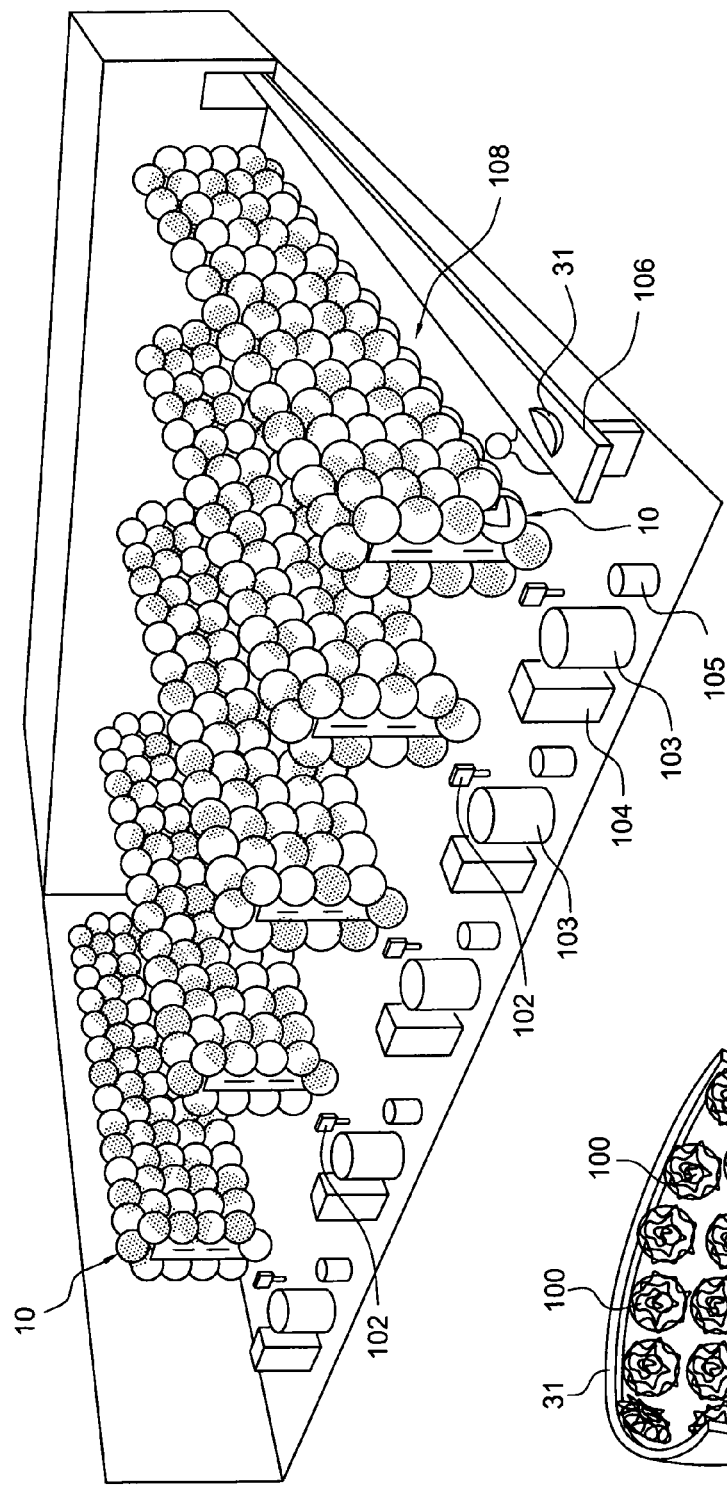
FIG. 12 is a perspective view of a sphere quarter with fully grown plants ready for cropping.
FIG. 13 is an overall perspective view of a plant utilizing spheres of the invention for carrying out the inventive method.

A typical factory for growing plants according to the invention is shown in FIG. 13 wherein carousels generally shown at 108 each containing ten spheres 10 are arranged in five rows. Tanks 103 contain water and plant nutrients which are delivered to the spheres as described herein. Electrical equipment cabinets 104 and control consoles 102 are used to select and regulate rotation speeds for the spheres in a given carousel and feed rates for water and nutrients.

Figure 14:
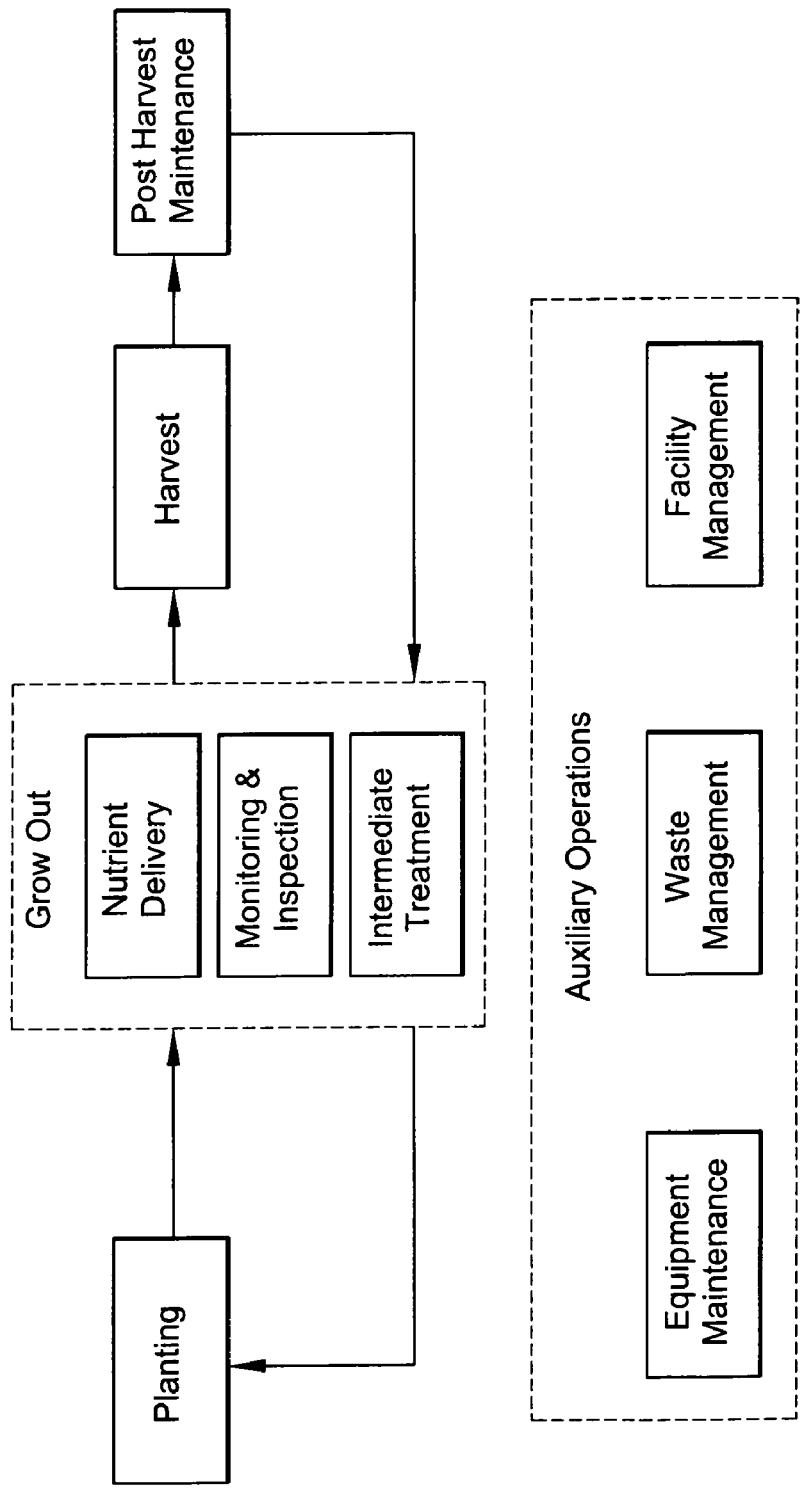
FIG. 14 is a flow diagram illustrating process flow of the plant shown in FIG. 13.

Conveyor belts 106 are used to move sphere segments 31 from a loading station to a cropping area and back. FIG. 12 shows segment 31 with mature lettuce plants 100 for harvesting. A segment 31, like the one in FIG. 12, is shown in FIG. 13 removed from a sphere and on belt 106 for movement to the rear for cropping the plants which are packaged and held for shipping in a refrigerated storage area. FIG. 14 illustrates the process flow for a typical plant such as shown in FIG. 13.

In other preferred embodiments, the interior of the sphere can be under pressure greater than atmospheric. The selected gas can be carbon dioxide or oxygen and fresh batches of water and plant nutrients are preferably delivered to the growth medium without recirculation. Oxygen added to the water stimulates root growth and the injection of carbon dioxide enhances plant growth and will eliminate mites and insects if they infiltrate a sphere, thus eliminating the use of pesticides.

Basil grown from seed and safflower seeds grown from seedlings are examples of plants that can be grown in high yields according to the invention. The invention is especially suited for growing leafy green vegetables, tomatoes, fruits and berries. The following is a representative list of crops that can be grown according to the invention:

Herbs
Aloe Vera
*Artemisia—Artemisia annua*
Basil—Ararat basil—Green Globe Basil—Sweet Salad Basil—Thai Basil
Cilantro—Spice Coriander—Santo Cilantro
*Echinacea—Echinacea purpurea*
*Eucalyptus—Eucalyptus globulus*—Peppermint Eucalyptus
Funnel
Golden seal
Lemon balm
Milk Thistle
Oregano—Greek Oregano—Italian Oregano—Mexican Oregano
Paprika—*Capsicum annuum*
Parsley—Afrodite parsley—Italian Parsley—Plain parsley
Peppermint
Chile Pepper—Habanero—Jalapeno—Tabasco—Scotch Bonnet—Cayenne
Sage—Extrakta Sage—Garden Sage
St. Johns Wart
*Yucca—Yucca glauca*

Vegetables
Beans—Golden Wax—Tender green
Broccoli—De Cicco
Cauliflower—Snowball
Lettuce—Butterhead—Loose leaf—Oak leaf Red—Romaine
Spinach—Mustard—New Zealand
Peppers—Cal wonder—Golden Cal Wonder—Sweet Chocolate—Jamaican Yellow
Tomato—Roma—Sweetie—
Pea—Mammoth melting—Oregon Sugar pod—

Berries
Blueberries—wild and cultured
Strawberries—all
Cranberries
Blackberries
Raspberries Each sphere is preferably 48 inches in diameter and has of four identical symmetrical sections. The spheres can be built in any size, however. For developmental purposes 48 inches provides for ease of use and ensures that plants are not required to stretch for light source. The spheres are preferably made of UV protected ABS plastic.

Light emitting diodes are preferred as the light source because they allow remote control of the spectrum of light within the sphere to accommodate and control specific stages of plant growth and development. LED's draw approximately 25% less power than fluorescent lamps. This makes the use of solar power feasible which is especially beneficial in remote regions.

Heat build up in the spheres, which normally operate at room temperature, can controlled regulating the interior temperature of the plant, by providing air circulation openings in the wall of the sphere with or without fans to increase circulation, and/or by exhausting interior air through the manifold system for watering.

Preferred injection needles 34 are about 4.5 inches in total length (about 3.5 inches from the interior wall of a sphere) and ⅜ inch in diameter. Needle sizes can be changed dependent upon the needs of the plant to be grown and can be made of injection molded thermoplastic. The number of needles may vary based on the needs of the plants being. Typical planting for a 48 inch sphere utilizes 24 injection needles per quarter 31 (for a total of 96 needles per sphere) in four rows of six needles equally spaced so plants do not need to compete for light.

Water and nutrients are and combined in a tank related to each carousel. The tank will feed each line to each sphere on each carousel simultaneously through the injector needles.

The ability to confine the entire system and the individual spheres allows for minimal or no product loss from rodents or insects. Plants are less likely to contract viruses than on the ground. The controlled environment allows the plants to grow in a sterile environment reducing bacterial and pest infestation without the use of poisons or other insecticides or fungicides. The spheres are self pollinating for fruits and vegetables that require pollination. This is accomplished rotating the spheres; pollen will fall and land on the other plants. No bees are needed.

In one aspect, the invention increases the amount of growing space for a given footprint. For example, in a 12,000 square foot plant as shown in FIG. 13, the actual footprint of the carousels is 6,000 square feet. This equals 50,000 square feet of level growing space.

Water is processed through a reverse osmosis tank to recycle the fertilizer. No soil depletion takes place and no crop rotation is required.

The invention is especially useful is providing a local source of fresh vegetables and fruit with low capital investment. Shipping costs are minimized and use of the spheres is not restricted by region or growing season: any location with a supply of water and power is suitable. Plants can be grown in accelerated growing cycles to meet everyday food needs as well as specialized requirements for specific needs such as by nutraceutical companies. World hunger needs can be addressed locally and high quality seedlings can be grown locally or on site for reforestation purposes. The demand for organically grown products is also met not only for foods but also for nonfood products like cosmetics and like products.

The invention also offers environmental advantages such as reduced fossil fuel use in transporting product to market, energy efficiency, reduced and negligible nutrient pollution, elimination of the use of toxic pesticides and fertilizers, controlled and reduced water usage and the reuse of abandoned or idle facilities.

EXAMPLES

The invention will now be illustrated by several examples which are not intended to limit or restrict the invention in any way.

Fertilizer Makeup

Vea A: Aqueous solution of nitrogen 1.5%; soluble pot ash derived from calcium and potassium nitrate, 2.6%.

Vea B: Aqueous solution of nitrogen 0.5%; nitrate nitrogen 0.5%; phosphate 0.5%; soluble pot ash derived from potassium nitrate, phosphoric acid and sulfate of pot ash, 5%.

All examples, except Example 5, used the same nutrient mixture (sometimes referred to in the examples as fertilizer) which was made by combining 30 ml of Veg A and 30 ml of Veg B in 8 liters of fresh water. In Example 5 (Sweet Wormwood), 45 ml Veg A and 30 ml Veg B were added to 8 liters of fresh water to provide extra nitrogen to the plants.

Spheres were rotated at one rpm in all examples.

The Squeeze Test for pH and ppm of Nutrients

The squeeze test referred to in the examples is a test to determine the ppm (parts per million) of nutrient salts and the pH levels within a Rock wool cube. The test is performed by gently "squeezing" the cube as to not damage the root mass. As it is squeezed, the liquid within the cube drips out and is collected in a clean container. The collected liquid is tested for pH and ppm levels. If the pH level has risen, the plant is growing because the plant takes up water and nutrients at different rates, changing the ppm level in the cube. When making up the nutrient mixture, nutrient salts are added to the fresh water (ppm=0) the ppm level goes up and the pH level drops. The pH is adjusted to the proper level for the plant being grown. As the plant uses the nutrient the ppm level drops and the pH level rises. By knowing the pH and ppm levels in a cube, the nutrient mixture can be adjusted to provide a balanced root zone environment. Too strong a nutrient mixture will cause burning of the roots. If the nutrient mixture is too weak, it will cause the plant to grow slowly and become deficient in nutrients.

Example 1

Basil

Day 1. Basil seed was planted into peat pucks using fertilizer free water at a pH of 5.8 for a pre soak. The plants were placed at room temperature under two 8 foot cool white color 80 watt fluorescent bulbs with a light cycle of 24 hours. A clear plastic lid was placed over the seeded pucks and the light source to create high humidity levels to help prompt germination.

Day 3. Seeds started to emerge.

Day 4. Lid removed for 12 hours.

Day 5. Seedlings transplanted into 3" Rock wool cubes, watered at pH 5.8 to half saturation with 1 ml/gallon Zyme (TM) root enzyme to create good bacterial growth and fight root decay. The plants/cubes were inserted onto needles 34 using locking ring 36 in sphere 10 for growth with a 400 watt high pressure sodium lamp (HPS) as the light source in tube 24. The lamp was on for 18 hours and off for 6 hours. Rotation speed of sphere 10 was set at 1 RPM.

Day 6. A squeeze test was done on a random cube to test for pH and ppm fertilizer to maintain the pH at 5.8-6.1 and 100 ppm fertilizer using Vegetative type fertilizer Super Veg A and Super Veg B (makeup above).

Day 7. More squeeze tests before watering. pH level was high and was adjusted to 3.5 to average out alkaline levels. As Rock wool dries the alkaline level goes up rapidly and the rate of water feed via needles 34 is adjusted to prevent dry-out and root burn.

Day 8. Fertilization increased to 200 ppm with water under pressure to carry more oxygen to the roots.

Day 9. Watered at 3.5 pH and 200 ppm fertilizer to half saturation, one gallon per sphere.

Days 10-12. Watered at 4.5 pH. Plants growing very well—good stock development and large foliage growth rates.

Days 13-15. Fertilizer levels increased to 400 ppm.

Days 16-22. Fertilizer levels increased to 600 ppm and water to 1.5 gallons each day.

Days 23-26. Fertilizer levels increased to 800 ppm and water to 2 gallons per day. Vigorous growth rate.

Days 27-30. Fertilizer levels increased to 1000 ppm. Lemon basil going to seed.

Days 31-34 Fertilizer free watering at pH 4.5 begun to flush salts and fertilizers out of the plants.

Day 35. Same as day 31. Plants ready to harvest. Very good taste with high levels of oil coming out of the leaves.

Example 2

Safflower

Day 1. Safflower seed was planted using the procedure and conditions of Day 1 of Example 1.

Day 2. Plants were sprouting.

Day 3. Plants sprouted and were 1 inch tall.

Day 4. Plants were 1.5 inches tall.

Day 5. Seedlings were transplanted as described for Day 5 of Example 1.

Days 6-9. Same as Days 6-9 of Example 1.

Days 10-12. Watered at pH 4.5. Plants growing were 4.5 inches tall with very good stock development and large foliage growth rates.

Days 13-15. Fertilizer increased to 600 ppm.

Days 16-22. Fertilizer increased to 800 ppm.

Days 23-28. Watering increased to 1.5 gallons.

Day 29. Same as Day 23; plants were 8 inches tall and beginning to form tops.

Days 30-35. Fertilizer increased to 1200 ppm and water to 2 gallons.

Days 36-48 Plants were starting to bulb with seed pods.

Days 49-93. Same as day 36; plants were producing healthy yellow flowers in profusion.

Days 94-97. Plants flushed with 4.5 pH water with no added fertilizer.

Day 98. Plants matured and were cropped. Seed weights and oil content comparable if not better than conventionally grown safflower seeds.

Example 3

Romaine I

Day 1. Peat pucks were pre-soaked in room temp water for 20 minutes. Two Romaine seeds were inserted in each puck and germination trays were placed under florescent lights as in Example 1.

Days 2-7. Germination trays were uncovered for 5 minutes each day and peat pucks were watered to keep them moist. First leaves appeared at Day 6.

Day 8. Seedlings were transplanted into Rock wool cubes (Rock wool) pre-soaked in fresh water with a pH 5.5 and placed in spheres.

Days 9-20. Plants were watered once in the morning and once at night; water pH was 6.2 and contained 150 ppm fertilizer—see Example 1. New growth was consistent; leaves were full with good color.

Day 11. Fertilizer increased to 200 ppm.

Days 12-20. Fertilizer reduced to 180. The system was flushed with fresh water twice on Day 13.

Day 21. Fertilizer increased to 200 ppm.

Days 22-29. Fertilizer increased to 210 ppm.

Days 30-39. Fertilizer increased to 250 ppm and watering to threes times daily at pH 6.2.

Days 40-41. Fertilizer increased to 280 ppm; plants were full and leaves with a dark green color, almost touching the plant in the opposite cube.

Days 42-45. Plants flushed with neutral pH without fertilizer.

Day 46. Harvested 96 heads of winter density Romaine lettuce.

Example 4

Spinach

Day 1. Same as Example 3 using one Spinach seed per peat puck.

Days 2-7. Same as Example 3.

Day 8. First leaves were visible.

Day 9. Seedlings transplanted into Rock wool cubes (Rock wool) pre-soaked in fresh 5.5 pH water and placed into a sphere.

Days 10-13. Plants watered and fed twice daily with pH 6.2 water containing 100 ppm fertilizer—see Example 1.

Days 14-16. Fertilizer increased to 110 ppm; new growth visible.

Days 17-29. Fertilizer increased to 130 ppm; new growth keeps coming, color is a deep green and leaf formation is uniform.

Days 30-32. Fertilizer increased to 200 ppm.

Days 33-36. Fertilizer increased to 250 ppm. Plants flushed twice with neutral water Day 35 to stop fertilizer burning.

Days 37-42. Fertilizer increased to 220 ppm.

Days 43-48. Plants were flushed with fresh neutral water with no fertilizer twice a day.

Day 49. Harvested 96 spinach plants.

Example 5

Sweet Wormwood (*Artemisia annual*)

Day 1. Soaked peat pucks in a fresh water solution with a pH of 6.3. Once the peat pucks were saturated I planted 24 peat pucks with one seed per puck and 24 peat pucks with multiple seeds. The seeded peat pucks were then placed under a florescent light in a germination tray with the lid on and the light set for 18 hours on and 6 hours off.

Day 2-7. The lid to the germination tray was lifted off for 5 minutes a day to replenish carbon dioxide. The peat pucks were watered from the top with a light spray with fresh water at a pH of 6.0.

Day 8. Rock wool cubes were presoaked for 24 hours at a pH of 5.4. The rooted peat pucks were placed in the Rock wool and transferred to the sphere under a 600 watt HPS light at 18 hours on and 6 hours off.

Day 9. Watered with a 150 ppm and a pH of 5.7.

Day 10. Watered with a 180 ppm and a pH of 5.7.

Day 11. Watered with a 210 ppm and a pH of 5.7.

Day 12. Squeeze test showed a ppm of 100 and a pH of 6.3. Watered plants at a ppm of 210 and a pH of 5.7. Plants are looking healthy and developing third and forth set of leaves.

Day 13. watered plants at a ppm of 200 and a pH of 5.7.

Day 14. watered plants at a ppm of 200 and a pH of 5.7.

Day 15. watered plants with a ppm of 210 and a pH of 5.7.

Day 16. plants are looking strong they are growing straight to the light and have good color. Watered with a 400 ppm and a pH of 5.9

Day 17. Watered plants with a ppm of 400 and a pH at 5.7.

Day 18. Watered plants with a ppm of 400 and a pH at 5.7.

Day 19. Watered plants at a ppm of 430 and a pH of 5.7. Plants are growing at a steady rate. Leafs are starting to become large and color is good.

Day 20. Watered plants at a ppm of 440 and a pH of 6.0.

Day 21. Watered the same as day 20.

Day 22. Plants are growing fast and all have good color. Watered with a ppm of 440 and a pH of 6.0.

Day 23. Watered plants at a ppm of 670 and a pH of 6.0.

Day 24. Watered plants at a ppm of 530 and a pH of 6.0.

Day 25. Watered plants at a ppm of 540 and a pH of 6.0.

Day 26. Watered plants at a ppm of 530 and a pH of 6.0.

Day 27. Squeeze test showed a ppm of 180 and a pH of 7.0. Plants were watered with a ppm of 530 and a pH of 5.8. Power Thrive at a rate of 1 ml/L. *Yucca* was also added at a rate of 7 drops per liter.

Day 28. Watered plants at a ppm of 580 and a pH of 5.8.

Day 29. Watered plants at a ppm of 580 and a pH of 5.8.

Day 30. Watered plants at a ppm of 580 and a pH of 5.8.

Day 31. Watered plants at a ppm of 500 and a pH of 5.8. ppm was dropped due to smaller plants showing signs of fertilizer burn.

In this example, growth of Sweet Wormwood was very rapid and the plants showed good color throughout the entire trial. This trial was run to find out how the plant reacts to fertilizer mixtures. Eventually the ppm level will be raised until the plant shows signs of burn and ultimately death to determine how much nutrient can be used on a rapidly growing plant.

Example 6

Butter Crunch Lettuce

Day 1. soaked peat pucks for 20 min. in water at room temp with a pH of 7.0. Planted seeds and put into germination trays with lids on under florescent lights at 18 hours on and 6 hours off.

Day 2. Removed lids for 5 min. to allow fresh oxygen into germination trays. Sprayed peat pucks just slightly till moist with room temp. Watered at 7.0 pH Day 3. Repeated steps from day 2. Soaked Rock wool cubes in room temp water at a pH of 5.5 for 24 hours.

Day 4. Drained cubes, transferred peat pucks from germination trays to Rock wool and set up sphere number 1 on an 18 hour on 6 hour off light cycle.

Day 5. Watered sphere at 150 ppm and a pH of 5.9.

Day 6. 8:30 am water sphere number 1 and number 2 at 150 ppm and 5.9 pH. First set of leaves wide open, new growth forming in sphere. 2:30 pm water spheres at 150 ppm and 5.9 pH.

Day 7. 8:30 am squeeze test indicates ample moisture from last watering changing water regiment to once a day. 2:30 pm water spheres 1 and 2 at 150 ppm and 5.9 pH.

Day 8. New growth is visible in both spheres. 8:30 am water at 150 ppm and a pH of 5.9.

Day 9. Squeeze test showed ppm levels in the Rock wool cubes were elevated to 3800 ppm. Flushed cubes with fresh water flush keeping the pH at 7.0. 1 flushed cubes a second time 4 hours later and repeated squeeze test pH and ppm levels ok.

Day 10. Squeeze test reveled ppm and pH levels back within acceptable range. 8:30 am watered plants with a 300 ppm water mix at a pH of 5.2. Plants showing signs of new growth and yellow on tips (this could be caused by over fertilization on day 8.).

Day 11. Squeeze test reveled pH of 6.1 and a ppm of 290 within the cubes. The moisture content within the cubes was satisfactory so we will keep on feeding once daily. Plants seem to be starting to move into vigorous growth. Changing feed mix to 410 ppm and a pH of 5.4.

Day 12. Squeeze test showed a pH of 6.4 and a ppm of 940, way to high. Fresh water flushed the cube with a pH of 5.4.

Day 13. fresh water flushed with neutral pH.

Day 14. watered with a ppm of 300 and a pH of 5.0.

Day 15. Squeeze test showed a ppm of 490 and a pH of 5.4. watered with a pH of 5.2 and a ppm of 300 also gave a fouler feeding at lights out. Squeeze test at lights out showed a pH of 6 and a ppm of 280.

Day 16. No change in results of squeeze test from last night. I watered today with a pH of 5.1 and a ppm of 380.

Day 17. Squeeze test showed 400 ppm and a pH of 5.6. The plants were watered with a 580 ppm and a 5.2 pH.

Day 18. Squeeze test showed a ppm of 400 and a pH of 5.8. The plants were watered with a mix of 590 ppm and a pH of 5.3. Plants are doing well looking healthy with a nice green shiny leaves.

Day 19. Flushed system with pH 5.1 fresh water. Plants were then watered with a pH 5.6 and a 480 ppm. Spray with a foliar feed (see below) at a rate of 1 ml/L.

Day 20 and 21. feed plants with a pH of 5.4 and a ppm of 530.

Day 22. flushed the system with fresh water at a pH of 5.4. Crop was then watered 1 hour later with a 430 ppm at a pH of 5.3.

Day 23. Plants are looking good they have nice color and no wilt. Watered plants with a 520 ppm and a 5.3 pH mix. 3 pm squeeze test showed a ppm of 830 and a pH of 5.7.

Day 24. Feed plants at 530 ppm and a pH of 6.1 then did a squeeze test 1 hour later and got a 6.3 pH and a 770 ppm. 2 hours later plants look green and vibrant.

Day 25. Plants were fed with a 600 ppm and a pH of 6.0 a squeeze test was performed 2 hours later and showed a pH of 6.2 and a ppm level of 410 all plants looking healthy. A late day squeeze test showed a pH of 6.0 and a ppm of 460. A water mix of a pH 6.2 and a ppm of 520 was administered.

Day 26. Watered plants at a pH of 6.2 and a ppm of 610.

Day 27 and 28. Watered plants with a 700 ppm a 6.0 pH mixture.

Day 29. Plants are looking good and green with firm leafs. Watered with a 700 ppm and a pH of 6.2 then applied a fouler feed spray.

Day 30. An early morning squeeze test showed a ppm level of 280 and a pH level of 7.0. Plants were feed with a 680 ppm and a pH of 5.8.

Day 31. Squeeze test showed a ppm of 200 and a pH of 6.5. Plants were watered with a 680 ppm and a 5.8 pH.

Day 32. Squeeze test showed a ppm level of 230 and a pH of 6.4. Plants were watered with a 670 ppm and a 5.7 pH.

Day 33. Squeeze test showed a ppm of 200 and a pH of 6.3. Plants were watered at a ppm of 670 and a pH of 5.7.

Day 34. Plants were feed with a ppm of 670 and a pH of 5.7.

Day 35. Plants were watered at a ppm of 670 and a pH of 5.7.

Day 36. Plants were watered with a 700 ppm and a pH of 5.7.

Day 38. Plants were watered with a 730 ppm and a pH of 5.7.

Day 39. Plants were watered with a 730 ppm and a pH of 5.7.

Day 40. A squeeze test showed a ppm of 210 and a pH of 7.0. Plants were watered with a ppm of 800 and a pH of 5.4. Leaf has good color and is developing nice. Texture is firm.

Day 41. Watered plants at a ppm of 800 and a pH of 5.7.

Day 42. Watered plants at a ppm of 800 and a pH of 5.7.

Day 43. Watered plants at a ppm of 800 and a pH of 5.7.

Day 44. Plants are looking strong and healthy they have good color. Some cubes with multiple plants are starting to show signs of nutrient deficiency's IE: tip burn and yellowing. Watered plants with a ppm of 800 and a pH of 5.9.

Day 45. Watered plants with a ppm of 850 and a pH of 6.0.

Day 46. Watered plants with a ppm of 840 and a pH of 5.7.

Day 47. Watered plants with a ppm of 840 and a pH of 5.7.

Day 48. Squeeze test showed a ppm of 230 and a pH of 6.5. Plants were watered at a ppm of 840 a pH of 5.7.

Day 49. Plants are large and growing at a good speed. Changed the bulb to a 600 watt HPS. Watered plants with a ppm of 740 and a pH of 5.7

Day 50. Watered plants at a ppm of 740 and a pH of 5.8.

Day 51. Started flushing process. Watered plants with fresh water at a pH of 6.0 twice.

Day 52. Flushed plants with fresh water at a pH of 6.0 twice.

Example 7

Leaf lettuce

Day 1. Soaked peat pucks for 20 min. in water at room temp with a pH of 7.0. Planted seeds and put into germination trays with lids on under florescent lights at 18 hours on and 6 hours off.

Day 2. Removed lids for 5 min. to allow fresh oxygen into germination trays. Sprayed peat pucks just slightly till moist with room temp. water at 7.0 pH.

Day 3. I repeat steps of day 2. Soaked Rock wool cubes in room temp water at a pH of 5.5 for 24 hours.

Day 4. Drained cubes, transferred peat pucks from germination trays to Rock wool and set up sphere number 1 on an 18 hour on 6 hour off light cycle.

Day 5. I water sphere number 1 at 150 ppm and a pH of 5.9.

Day 6. 8:30 am water at 150 ppm and 5.9 pH. First set of leaves wide open, new growth forming. 2:30 pm water sphere at 150 ppm and 5.9 pH.

Day 7. 8:30 am squeeze test indicates ample moisture from last watering changing water regiment to once a day. 2:30 pm water spheres 1 at 150 ppm and a 5.9 pH.

Day 8. New growth is visible in the sphere. 8:30 am water at 150 ppm and 5.9 pH.

Day 9. Squeeze test showed ppm levels in the Rock wool cubes were elevated to 3800 ppm. Flushed cubes with fresh water flush keeping the pH at 7.0. Flushed cubes a second time 4 hours later and repeated squeeze test pH and ppm levels ok.

Day 10. Squeeze test reveled ppm and pH levels back within acceptable range. 8:30 am watered plants with a 300 ppm water mix at a pH of 5.2. sphere showing new growth.

Day 11. Squeeze test reveled pH of 6.1 and a ppm of 290 within the cubes. The moisture content within the cubes was satisfactory; kept on feeding once daily. Plants seem to be starting to move into vigorous growth. Changing feed mix to 410 ppm and a pH of 5.4.

Day 12. Squeeze test showed a pH of 6.4 and a ppm of 940, way to high. Fresh water flushed the cube with a pH of 5.4.

Day 13. fresh water flushed with neutral pH.

Day 14. watered with a ppm of 300 and a pH of 5.0.

Day 15. Squeeze test showed a ppm of 490 and a pH of 5.4 watered with a pH of 5.2 and a ppm of 300 also gave a fouler feeding (see below) at lights out. Squeeze test at lights out showed a pH of 6 and a ppm of 280.

Day 16. No change in results of squeeze test from last night. I watered today with a pH of 5.1 and a ppm of 380.

Day 17. Squeeze test showed 400 ppm and a pH of 5.6. I watered with a 580 ppm and a 5.2 pH.

Day 18. Squeeze test showed a ppm of 400 and a pH of 5.8. I watered with a mix of 590 ppm and a pH of 5.3. Plants are doing well looking healthy with a nice green shiny leaves.

Day 19. Changed light to a 125 watt florescent and flushed system with pH 5.1 fresh water. Plants were then watered with a pH 5.6 and a 480 ppm. Spray with a foliar feed at a rate of 2 ml/L of pure fulvic acid (see below).

Day 20 and 21. feed plants with a pH of 5.4 and a ppm of 530.

Day 22. Flushed system with fresh water at a pH of 5.4. Crop was then watered 1 hour later with a 430 ppm at a pH of 5.3. Florescent bulb was changed back to a 600 watt metal halide plants looked wilted and weak.

Day 23. Plants look good. Nice color and no wilt. Watered plants with a 520 ppm and a 5.3 pH mix. 3 pm squeeze teas showed a ppm of 830 and a pH of 5.7.

Day 24. Feed plants at 530 ppm and a pH of 6.1 then did a squeeze test 1 hour later and got a 6.3 pH and a 770 ppm. 2 hours later plants look green and vibrant. Changed bulb to a 600 w metal halide and stayed with a 6.3 pH and a 770 ppm.

Day 25. Plants were fed with a 600 ppm and a pH of 6.0 a squeeze test was performed 2 hours later and showed a pH of 6.2 and a ppm level of 410 all plants looking healthy. A late day squeeze test showed a pH of 6.0 and a ppm of 460. A water mix of a pH 6.2 and a ppm of 520 was administered.

Day 26. Watered plants at a pH of 6.2 and a ppm of 610.

Day 27 and 28. Watered plants with a 700 ppm and a 6.0 pH mixture.

Day 29. Plants are looking good and green with firm leafs. Watered with a 700 ppm and a pH of 6.2 then applied a fouler feed spray.

Day 30. A early morning squeeze test showed a ppm level of 280 and a pH level of 7.0. Plants were feed with a 680 ppm and a pH of 5.8.

Day 31. Squeeze test showed a ppm of 200 and a pH of 6.5. Plants were watered with a 680 ppm and a 5.8 pH.

Day 32. Squeeze test showed a ppm level of 230 and a pH of 6.4. Plants were watered with a 670 ppm and a 5.7 pH.

Day 33. Squeeze test showed a ppm of 200 and a pH of 6.3. Plants were watered at a ppm of 670 and a pH of 5.7.

Day 34. Plants were feed with a ppm of 670 and a pH of 5.7.

Day 35. Squeeze test showed a ppm of 200 and a pH of 6.3. Plants are close to being ready to harvest. Fresh water (ppm of 0 and a pH of 5.7) was applied to start the flushing process. Plants will be flushed twice a day for the next two days to remove all residual salts from the plants.

Day 36. Flushed with fresh water at 0 ppm and a pH of 5.7.

Day 37. Flushed system with fresh water at a pH of 5.7 and fed at a rate of 630 ppm and a pH of 5.7.

Day 38. Plants were watered with a ppm of 730 and a pH of 5.7.

Day 39. Plants were watered with a ppm of 730 and a pH of 5.7.

Day 40. Plants were watered with a ppm of 730 and a pH of 5.7. Leafs looking a good color and nice broad formation in cubes with 1 plant pre cube. Cubes with multiple plants are showing signs of fertilizer deficiency's and some of the weaker plants are dyeing off and turning brown.

Day 41. A squeeze test showed a plants are in vigor's growth cubes were to dry to take a sample, multiple daily feedings will need to be done to correct the problem. Plants were watered with a ppm of 800 and a pH of 5.6.

Day 42. Watered plants at a ppm of 800 and a pH of 5.7 in the morning and again at late afternoon.

Day 43. Started flushing process. Watered plants with fresh water at a pH of 6.0 once in the morning and again in late afternoon.

Day 44. Flushed with fresh water at a pH of 5.7 twice.

Day 45. Cropped lettuce. Lettuce had large leaves and good color in plants that only had 1 plant per cube but multiple plants in the same cube were spindly, under developed and had visible signs of nutrient deficiency. The plants would benefit from more spacing; a more uniform crop could be produced with 18 plants per sphere quarter.

Foliar Feed

A foliar feed is a nutrient mixture of fulvic acid which is a 100% organic bio-catalyst made up of a blend of 16 organic acids that help plants take in needed minerals and nutrients. Fulvic acid is derived from humic acid (manufactured by GeoTek manufacturing Inc., Langley B.C., Canada) and is used for transporting minerals and nutrients from the nutrient mixture into the plant. Fulvic acid is taken by the plant cells and acts as a catalyst to ensure that the cells take in precisely the right amount of minerals and nutrients needed. As a foliar spray, fulvic acid is mixed 2 to 4 ml per liter of water and spray-misted lightly over the crop. It is used twice during the vegetative stage and once during the flowering stage.

What is claimed is:

1. A method for growing plants, which comprises:
   (a) providing a vertical carousel of contiguous, intermeshing horizontal arrays moveable together, each of said arrays comprising a series of members having a concave interior and a convex exterior, said concave interior carrying plants that grow towards a growth promoting light source at the center of each array which is operable during periods of plant growth and non-growth, the convex exterior surfaces of one array intermeshing with the convex exterior surfaces of adjacent contiguous arrays;
   (b) rotating one of said arrays thereby causing all of the intermeshing arrays to rotate together at the same speed; and (c) watering all the plants in an array at the same time while the arrays are rotating to maintain even weight distribution within each array for smooth, balanced rotation.

2. The method of claim 1, wherein said series of members are segments of a sphere.

3. The method of claim 2, wherein said plants are carried on a plurality of spaced porous needles pointing at the center of the array and water is delivered via said porous needles to the plants as they rotate.

4. Method of claim 1, wherein said carousel moves in a noncircular path.

5. A method for growing plant, which comprises:
(a) providing a vertical carousel of contiguous, intermeshing horizontal arrays each comprising a series of members having a concave interior and a convex exterior, said concave interior carrying plants that grow towards a growth promoting light source at the center of each array which is operable during periods of plant growth and non-growth, the convex exterior surfaces of one array intermeshing with the convex exterior surfaces of adjacent contiguous arrays;
(b) rotating one of said arrays thereby causing all of the intermeshing arrays in the carousel to rotate together at the same speed; and
(c) moving the arrays in the carousel together from a drive position in which said one array is rotated to an unloading/loading position in which said one array is not rotated.

6. The method of claim 5, wherein all the plants in an array are watered at the same time while the arrays in the carousel are rotating to maintain even weight distribution within each array for smooth, balanced rotation.

7. The method of claim 5, wherein said series of members are segments of a sphere.

8. The method of claim 7, wherein said plants are carried on a plurality of spaced porous needles pointing at the center of the array and water is delivered via said porous needles to the plants as they rotate.

9. Method of claim 5, wherein said carousel moves in a noncircular path.

10. An apparatus for growing plants, comprising:
(a) a vertical carousel of contiguous, intermeshing horizontal arrays moveable together, each of said arrays comprising a series of members having a concave interior and a convex exterior, said concave interior carrying plants that grow towards a growth promoting light source at the center of each array which is operable during periods of plant growth and non-growth, the convex exterior surfaces of each array intermeshing with the exterior surface of adjacent contiguous array;
(b) means to rotate one of said arrays thereby causing all of the contiguous intermeshing arrays in the carousel to rotate together at the same speed; and
(c) means to water all the plants in an array at the same time while the arrays are rotated to maintain even weight distribution within each array for smooth, balanced rotation.

11. The apparatus of claim 10, wherein said convex surfaces have gear teeth which intermesh.

12. The apparatus of claim 10, wherein said series of members are segments of a sphere.

13. The apparatus of claim 12, wherein said plants are carried on a plurality of spaced porous needles pointing at the center of the array and water is delivered via said porous needles to the plants as they rotate.

14. Method of claim 10, wherein said carousel moves in a noncircular path.

15. An apparatus for growing plants, comprising:
(a) a vertical carousel of contiguous, intermeshing horizontal arrays each comprising a series of members having a concave interior and a convex exterior, said concave interior carrying plants that grow towards a growth promoting light source at the center of each array which is operable during periods of plant growth and non-growth, the convex exterior surfaces of each array intermeshing with the exterior surface of adjacent contiguous array;
(b) means to rotate one of said arrays thereby causing all of the intermeshing arrays in the carousel to rotate together at the same speed; and
(c) means to move the arrays in the carousel together from a drive position in which said means to rotate said one array is engaged to an unloading/loading position in which said means to rotate is disengaged.

16. The apparatus of claim 15, including means to water all the plants in an array at the same time while the arrays are rotated to maintain even weight distribution within each array for smooth, balanced rotation.

17. The apparatus of claim 15, wherein said convex surfaces have gear teeth which intermesh.

18. The apparatus of claim 15, wherein said series of members are segments of a sphere.

19. The apparatus of claim 18, wherein said plants are carried on a plurality of spaced porous needles pointing at the center of the array and water is delivered via said porous needles to the plants as they rotate.

20. Method of claim 15, wherein said carousel moves in a noncircular path.

21. A method for growing plants, which comprises:
(a) providing a vertical carousel of contiguous, intermeshing horizontal arrays moveable together, each of said arrays comprising a series of members having a concave interior and a convex exterior, said concave interior carrying plants that grow towards a growth promoting light source at the center of each array which is operable during periods of plant growth and non-growth, the convex exterior surfaces of one array intermeshing with the convex exterior surfaces of adjacent contiguous arrays;
(b) rotating one of said arrays thereby causing all of the intermeshing arrays to rotate together at the same speed;
(c) moving the arrays in the carousel together from a drive position in which said one array is rotated to an unloading/loading position in which said one array is not rotated; and
(d) watering all the plants in an array at the same time while the arrays are rotating to maintain even weight distribution within each array for smooth, balanced rotation.

22. An apparatus for growing plants, comprising:
(a) a vertical carousel of contiguous, intermeshing horizontal arrays moveable together, each of said arrays comprising a series of members having a concave interior and a convex exterior, said concave interior carrying plants that grow towards a growth promoting light source at the center of each array which is operable during periods of plant growth and non-growth, the convex exterior surfaces of each array intermeshing with the exterior surface of adjacent contiguous arrays;
(b) means to rotate one of said arrays thereby causing all of the contiguous intermeshing arrays in the carousel to rotate together at the same speed;
(c) means to move the arrays in the carousel together from a drive position in which said means to rotate said one array is engaged to an unloading/loading position in which said means to rotate is disengaged; and (d) means to water all the plants in an array at the same time while the arrays are rotated to maintain even weight distribution within each array for smooth, balanced rotation.

23. A method for growing plants, which comprises:
(a) providing a vertical carousel of contiguous, intermeshing horizontal arrays moveable together, each of said arrays carrying plants on the interior thereof that grow towards a growth promoting light source at the center of each array which is operable during periods of plant growth and non-growth, the exterior surfaces of each array intermeshing with the exterior surface of adjacent contiguous arrays;
(b) rotating one of said arrays thereby causing all of the intermeshing arrays to rotate together at the same speed; and
(c) moving the arrays in the carousel together from a drive position in which said one array is rotated to an unloading/loading position in which said one array is not rotated.

24. The method of claim 23, wherein all the plants in an array are watered at the same time while the arrays are rotating to maintain even weight distribution within each array for smooth, balanced rotation.

25. An apparatus for growing plants, comprising:
(a) a vertical carousel of contiguous, intermeshing horizontal arrays moveable together, each of said arrays carrying plants on the interior thereof that grow towards a growth promoting light source at the center of each array which is operable during periods of plant growth and non-growth, the exterior surfaces of each array intermeshing with the exterior surface of adjacent contiguous arrays;
(b) means to rotate one of said arrays thereby causing all of the contiguous intermeshing arrays in the carousel to rotate together at the same speed; and
(c) means to move the arrays in the carousel together from a drive position in which said means to rotate said one array is engaged to an unloading/loading position in which said means to rotate is disengaged.

26. The apparatus of claim 25, which includes means to water all the plants in an array at the same time while the arrays are rotated to maintain even weight distribution within each array for smooth, balanced rotation.

27. A method for growing plants, which comprises:
(a) providing a vertical carousel of contiguous, intermeshing horizontal arrays moveable together, each of said arrays carrying plants on the interior thereof that grow towards a growth promoting light source at the center of each array which is operable during periods of plant growth and non-growth, the exterior surfaces of each array intermeshing with the exterior surface of adjacent contiguous arrays;
(b) rotating one of said arrays thereby causing all of the intermeshing arrays to rotate together at the same speed;
(c) moving the arrays in the carousel together from a drive position in which said one array is rotated to an unloading/loading position in which said one array is not rotated; and
(d) watering all the plants in an array at the same time while the arrays are rotating to maintain even weight distribution within each array for smooth, balanced rotation.

28. An apparatus for growing plants, comprising:
(a) a vertical carousel of contiguous, intermeshing horizontal arrays moveable together, each of said arrays carrying plants on the interior thereof that grow towards a growth promoting light source at the center of each array which is operable during periods of plant growth and non-growth, the exterior surfaces of each array intermeshing with the exterior surface of adjacent contiguous arrays;
(b) means to rotate one of said arrays thereby causing all of the contiguous intermeshing arrays in the carousel to rotate together at the same speed;
(c) means to move the arrays in the carousel together from a drive position in which said means to rotate said one array is engaged to an unloading/loading position in which said means to rotate is disengaged; and
(d) means to water all the plants in an array at the same time while the arrays are rotated to maintain even weight distribution within each array for smooth, balanced rotation.

* * * * *